(12) United States Patent
Kim et al.

(10) Patent No.: US 11,652,801 B2
(45) Date of Patent: May 16, 2023

(54) NETWORK ACCESS CONTROL SYSTEM AND METHOD THEREFOR

(71) Applicant: PRIBIT Technology, Inc., Seoul (KR)

(72) Inventors: Young Rang Kim, Seoul (KR); Min Jae Lee, Seoul (KR); Pil Ho Song, Seoul (KR); Joo Tae Kim, Seoul (KR)

(73) Assignee: PRIBIT TECHNOLOGY, INC., Seoul (KR)

( * ) Notice: Subject to any disclaimer, the term of this patent is extended or adjusted under 35 U.S.C. 154(b) by 0 days.

(21) Appl. No.: 17/656,070

(22) PCT Filed: Sep. 24, 2020

(86) PCT No.: PCT/KR2020/012923
§ 371 (c)(1),
(2) Date: Mar. 23, 2022

(87) PCT Pub. No.: WO2021/060853
PCT Pub. Date: Apr. 1, 2021

(65) Prior Publication Data
US 2022/0247718 A1 Aug. 4, 2022

Related U.S. Application Data

(63) Continuation-in-part of application No. 16/580,974, filed on Sep. 24, 2019, now Pat. No. 11,381,557.

(30) Foreign Application Priority Data

Apr. 14, 2020 (KR) .......................... 10-2020-0045525

(51) Int. Cl.
*H04L 9/40* (2022.01)
*H04L 12/46* (2006.01)
*H04L 69/16* (2022.01)

(52) U.S. Cl.
CPC ........ *H04L 63/029* (2013.01); *H04L 12/4633* (2013.01); *H04L 69/16* (2013.01)

(58) Field of Classification Search
CPC .... H04L 63/029; H04L 12/4633; H04L 69/16
See application file for complete search history.

(56) References Cited

U.S. PATENT DOCUMENTS 7,606,902 B2    10/2009    Rao et al.
7,978,714 B2     7/2011    Rao et al.
(Continued)

FOREIGN PATENT DOCUMENTS

CN    104284385 A    1/2015
CN    105471748 A    4/2016
(Continued)

OTHER PUBLICATIONS

International Search Report and Written Opinion of the International Searching Authority; Application No. PCT/KR2020/012923; Completed: Jan. 5, 2021; dated Jan. 5, 2021; 9 Pages.
(Continued)

*Primary Examiner* — Mohammad W Reza
(74) *Attorney, Agent, or Firm* — Husch Blackwell LLP

(57) ABSTRACT

A network access control system and a method are disclosed. In a step of generating a transmission control protocol (TCP) session between a terminal and a gateway (or a server), the TCP session is authenticated, and whether or not to generate the TCP session is determined on the basis of a result of the authentication, thereby preventing, in advance, a target application within the terminal from bypassing control of an access control application and transmitting a data packet to a destination network through an authorized tunnel.

20 Claims, 16 Drawing Sheets

(56) References Cited

U.S. PATENT DOCUMENTS

| | | |
|---|---|---|
| 8,019,868 B2 | 9/2011 | Rao et al. |
| 8,291,119 B2 | 10/2012 | Rao et al. |
| 8,363,650 B2 | 1/2013 | Rao et al. |
| 8,843,998 B2 | 9/2014 | Fu et al. |
| 8,892,778 B2 | 11/2014 | Rao et al. |
| 8,897,299 B2 | 11/2014 | Rao et al. |
| 9,088,564 B1 | 7/2015 | Hobson et al. |
| 9,106,538 B1 | 8/2015 | Asnis |
| 9,143,942 B2 | 9/2015 | Agarwal et al. |
| 9,148,408 B1 | 9/2015 | Glazemakers et al. |
| 9,240,938 B2 | 1/2016 | Dimond et al. |
| 9,578,052 B2 | 2/2017 | Cp et al. |
| 9,715,597 B2 | 7/2017 | Smith et al. |
| 9,948,612 B1 | 4/2018 | Jawahar |
| 9,984,230 B2 | 5/2018 | Pikhur et al. |
| 10,033,766 B2 | 7/2018 | Gupta et al. |
| 10,122,703 B2 | 11/2018 | Innes et al. |
| 10,162,767 B2 | 12/2018 | Spurlock et al. |
| 10,176,344 B2 | 1/2019 | Smith et al. |
| 10,205,743 B2 | 2/2019 | Cp et al. |
| 10,218,679 B1 | 2/2019 | Jawahar |
| 10,243,833 B2 | 3/2019 | Tang et al. |
| 10,326,672 B2 | 6/2019 | Scheib et al. |
| 10,339,303 B2 | 7/2019 | Mehta et al. |
| 10,402,577 B2 | 9/2019 | Knapp et al. |
| 10,432,592 B2 | 10/2019 | Singleton, IV et al. |
| 10,484,334 B1 | 11/2019 | Lee et al. |
| 10,659,434 B1 | 5/2020 | Kim et al. |
| 10,659,462 B1 | 5/2020 | Kim et al. |
| 10,785,111 B2 | 9/2020 | Hill et al. |
| 10,992,473 B2 | 4/2021 | Jawahar |
| 2002/0163920 A1 | 11/2002 | Walker et al. |
| 2005/0060328 A1* | 3/2005 | Suhonen ............... H04L 63/104 |
| 2005/0273853 A1 | 12/2005 | Oba et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0037071 A1 | 2/2006 | Rao et al. |
| 2010/0002693 A1 | 1/2010 | Rao et al. |
| 2010/0024026 A1 | 1/2010 | Ylonen et al. |
| 2010/0061253 A1* | 3/2010 | Kaminsky ............... H04L 41/12 |
| | | 370/248 |
| 2013/0083799 A1* | 4/2013 | Xie ....................... H04L 47/193 |
| | | 370/394 |
| 2013/0128892 A1 | 5/2013 | Rao et al. |
| 2013/0232263 A1 | 9/2013 | Kelly et al. |
| 2013/0322255 A1 | 12/2013 | Dillon |
| 2014/0101716 A1 | 4/2014 | Touboul |
| 2014/0237137 A1 | 8/2014 | Ervin et al. |
| 2014/0301397 A1 | 10/2014 | Zhou |
| 2015/0121449 A1 | 4/2015 | Cp et al. |
| 2015/0341259 A1 | 11/2015 | Li et al. |
| 2015/0347768 A1 | 12/2015 | Martin et al. |
| 2016/0092700 A1 | 3/2016 | Smith et al. |
| 2016/0094543 A1 | 3/2016 | Innes et al. |
| 2016/0094546 A1 | 3/2016 | Innes et al. |
| 2016/0142293 A1 | 5/2016 | Hu et al. |
| 2016/0180092 A1 | 6/2016 | Aktas |
| 2016/0182550 A1 | 6/2016 | Spurlock |
| 2016/0330177 A1 | 11/2016 | Singleton, IV et al. |
| 2016/0359673 A1 | 12/2016 | Gupta et al. |
| 2016/0360352 A1 | 12/2016 | Khan et al. |
| 2016/0371484 A1 | 12/2016 | Mehta et al. |
| 2016/0378685 A1 | 12/2016 | Spurlock et al. |
| 2016/0378975 A1 | 12/2016 | Pikhur et al. |
| 2016/0379003 A1 | 12/2016 | Kapoor et al. |
| 2016/0381051 A1 | 12/2016 | Edwards et al. |
| 2017/0041229 A1* | 2/2017 | Zheng .................... H04L 69/22 |
| 2017/0063782 A1 | 3/2017 | Jain et al. |
| 2017/0078184 A1 | 3/2017 | Tang et al. |
| 2017/0118228 A1 | 4/2017 | Cp et al. |
| 2017/0339631 A1 | 11/2017 | Pugaczewski et al. |
| 2018/0013786 A1 | 1/2018 | Knopf |
| 2018/0018476 A1 | 1/2018 | Smith et al. |
| 2019/0014152 A1 | 1/2019 | Verma et al. |
| 2019/0109822 A1 | 4/2019 | Clark et al. |
| 2019/0109848 A1 | 4/2019 | Clark et al. |
| 2019/0149514 A1 | 5/2019 | Jawahar |
| 2019/0155752 A1 | 5/2019 | Spurlock et al. |
| 2019/0173736 A1 | 6/2019 | Ponnuswamy et al. |
| 2019/0173891 A1 | 6/2019 | Cp et al. |
| 2019/0222559 A1 | 7/2019 | Wang et al. |
| 2019/0238592 A1 | 8/2019 | Qureshi et al. |
| 2019/0278908 A1 | 9/2019 | Mehta et al. |
| 2019/0306035 A1 | 10/2019 | Scheib et al. |
| 2019/0349341 A1 | 11/2019 | Singleton, IV et al. |
| 2019/0349369 A1 | 11/2019 | Bengtson et al. |
| 2019/0349641 A1 | 11/2019 | Choi et al. |
| 2020/0177550 A1 | 6/2020 | Valluri et al. |
| 2020/0244625 A1 | 7/2020 | Tummalapenta et al. |
| 2020/0287749 A1 | 9/2020 | Glazemakers et al. |
| 2020/0389393 A1 | 12/2020 | Bosch et al. |
| 2021/0243163 A1 | 8/2021 | Miriyala et al. |

FOREIGN PATENT DOCUMENTS

| | | |
|---|---|---|
| CN | 107445011 A | 12/2017 |
| EP | 3254415 A1 | 12/2017 |
| JP | 2007243655 A | 9/2007 |
| JP | 2009163546 A | 7/2009 |
| JP | 2011015327 A | 1/2011 |
| JP | 2011166704 A | 8/2011 |
| JP | 6239341 B2 | 7/2013 |
| JP | 2017535843 A | 11/2017 |
| JP | 2017537501 A | 12/2017 |
| JP | 2018508140 A | 3/2018 |
| JP | 2018524843 A | 8/2018 |
| JP | 2019079504 A | 5/2019 |
| KR | 1020020088728 A | 11/2002 |
| KR | 1020030075810 A | 9/2003 |
| KR | 100692653 B1 | 3/2007 |
| KR | 1020070037650 A | 4/2007 |
| KR | 100748698 B1 | 8/2007 |
| KR | 1020070102698 A | 10/2007 |
| KR | 100856674 B1 | 8/2008 |
| KR | 1020100008740 A | 1/2010 |
| KR | 101020470 B1 | 2/2011 |
| KR | 1020120045859 A | 5/2012 |
| KR | 101173583 B1 | 8/2012 |
| KR | 1020130045919 A | 5/2013 |
| KR | 1020130076798 A | 7/2013 |
| KR | 1020140055857 A | 5/2014 |
| KR | 1020140074357 A | 6/2014 |
| KR | 101481337 B1 | 1/2015 |
| KR | 1020150013453 A | 2/2015 |
| KR | 1020150088494 A | 8/2015 |
| KR | 101561108 B1 | 10/2015 |
| KR | 101578193 B1 | 12/2015 |
| KR | 1020160029660 A | 3/2016 |
| KR | 1020160056118 A | 5/2016 |
| KR | 1020160123069 A | 10/2016 |
| KR | 1020170010835 A | 2/2017 |
| KR | 101743559 B1 | 6/2017 |
| KR | 1020170063795 A | 6/2017 |
| KR | 1020170132608 A | 12/2017 |
| KR | 1020180006413 A | 1/2018 |
| KR | 1020180019273 A | 2/2018 |
| KR | 1020180030023 A | 3/2018 |
| KR | 1020180032864 A | 4/2018 |
| KR | 101861201 B1 | 5/2018 |
| KR | 1020180062838 A | 6/2018 |
| KR | 1020180086964 A | 8/2018 |
| KR | 101910605 B1 | 10/2018 |
| KR | 1020180132868 A | 12/2018 |
| KR | 1020190036504 A | 4/2019 |
| KR | 1020190052541 A | 5/2019 |
| KR | 1020190073114 A | 6/2019 |
| KR | 102119257 B1 | 6/2020 |
| KR | 102146568 B1 | 8/2020 |
| WO | 2014062337 A | 4/2014 |
| WO | 2016057177 A | 4/2016 |
| WO | 2016190641 A1 | 12/2016 |
| WO | 2017016473 A | 2/2017 |
| WO | 2021060856 A1 | 4/2021 |

(56) References Cited

FOREIGN PATENT DOCUMENTS

OTHER PUBLICATIONS

Hassan, Suhaidi, et al.; Border Gateway Protocol based Path Vector mechanism for inter-domain routing in Software Defined Network environment; IEEE Conference on Open Systems (ICOS); Langkawi, Malaysia; Oct. 10, 2016; 5 Pages.

Glatz, Eduard, et al.; Classifying Internet One-way Traffic; Proceedings of the 12th ACM Sigmetrics/Performance joint international conference on Measurement and Modeling of Computer Systems (Sigmetrics 12); Association for Computing Machinery; New York, NY, USA; May 15, 2012; 29 Pages.

Bilger, Brent, et al.; Cloud Security Alliance (CSA); Software-Defined Perimeter Working Group (SDP) Specification 1.0; Apr. 2014; 28 Pages.

Garbis, Jason, et al.; Cloud Security Alliance (CSA); Software-Defined Perimeter Architecture Guide; Mar. 10, 2020; 43 Pages.

Waliyi, Adebayo Gbenga; Study and Implementation of Wireless Sensor Networks to Manage Energy in a Smart Home; African University of Science and Technology; AUST Institutional Repository; Abuja, Nigeria; Dec. 15, 2017; 69 Pages.

Ikuta, Takayuki, et al.; Software Defined Perimeter (SDP) Usage Scenario Collection, Version 1.0; Japan Cloud Security Alliance, SDP Working Group; Apr. 25, 2019; 52 Pages.

Korean Office Action; Application No. 10-2020-0117543; dated Nov. 13, 2020; 6 pages.

Korean Notice of Allowance; Application No. KR 10-2020-0105345; dated May 2, 2021.

Japanese Office Action; Application No. 2021-039780; dated Jun. 8, 2021; 13 Pages.

Extended European Search Report; Application No. 21162189.1; Completed: Jul. 7, 2021; dated Jul. 16, 2021; 44 Pages.

U.S. Notice of Allowance; U.S. Appl. No. 16/580,974; dated Mar. 14, 2022; 8 Pages.

* cited by examiner

NETWORK ACCESS CONTROL SYSTEM AND METHOD THEREFOR

CROSS-REFERENCE TO RELATED APPLICATIONS

The present application is the National Stage of International Application No. PCT/KR2020/012923, filed on Sep. 24, 2020, which claims priority from U.S. patent application Ser. No. 16/580,866, filed on Sep. 24, 2019, and Ser. No. 16/580,974, filed on Sep. 24, 2019. International Application No. PCT/KR2020/012923 claims priority to Korean Patent Application No. 10-2020-0045525, filed on Apr. 14, 2020.

The present application is a continuation-in-part of U.S. patent application Ser. No. 16/580,974, filed on Sep. 24, 2019. All prior applications are herein incorporated by reference.

TECHNICAL FIELD

The present disclosure relates to technologies of controlling network access of a terminal based on a tunneling technology.

BACKGROUND ART

Because an environment of controlling network access of a terminal based on a tunneling technology is able to allow an authorized terminal to access a target network through an authorized tunnel to fundamentally block access of an unauthorized terminal or access using a general TCP/IP mechanism, there are advantages capable of minimizing security and threat inherent in the TCP/IP and authorizing network access based on various pieces of identification information (a terminal ID, a user ID, and the like) in a network access process based on an IP address.

The tunneling technology used in general, for example, IP security protocol virtual private network (IPSec VPN), Open VPN, or generic routing encapsulation (GRE) tunneling, is based on an access target for each terminal or each network, and a secure socket layer (SSL)/transport layer security (TTL) VPN is devised to be connected to an access target for each smaller web service.

Because the network access of the terminal is by a request of each application (a transmission request of a data packet) run (operated) on the terminal, the tunneling technology established for each terminal has a structure incapable of performing access control for each application.

Particularly, in a zero trust terminal environment, when providing a tunnel to a terminal having various potential threats which are not detected by a malware detection application, there is a problem in which malware and a malicious code arrive at a destination network through the tunnel. Because malware transmitted to an encrypted tunnel is not detected by a threat data packet filtering technology such as an intrusion detection system (IDS) or an intrusion prevention system (IPS), the tunneling technology may rather threaten the network.

A technology such as a tunnel visibility solution combines the threat data packet filtering technology with a tunnel endpoint (TEP) to address it, but this is an obtained technology, does not previously block a data packet transmitted to the tunnel, and has a problem for performance degradation and an obstacle according to the combination of the filtering technology.

As a result, to provide a perfect tunnel-based accessibility control network environment, there should be a structure capable of being combined with a technology capable of allowing an authorized application to access the network, for example, an application whitelist list technology recommended by the National Institute of Standards and Technology (NIST), such that an unauthorized application (e.g., malware, a malicious code, an uncontrollable application, or the like) is unable to transmit a data packet to the tunnel, to allow only an authorized application to transmit a data packet through an authorized tunnel.

However, because the tunneling technology still has an extensive access range, when malware which is present in the terminal bypasses the application whitelist technology and transmits a data packet through an authorized tunnel, No method capable of blocking it has been proposed so far.

Details described in the background art are written to increase the understanding of the background of the present disclosure, which may include details rather than an existing technology well known to those skilled in the art.

DISCLOSURE

Technical Problem

An aspect of the present disclosure provides a system for controlling network access for authenticating a transmission control protocol (TCP) session in a process of generating the TCP session between a terminal and a gateway (or a server), and determining whether to generate the TCP session based on the authenticated result to previously block a target application in a terminal from bypassing control of an access control application and transmitting a data packet to a destination network through an authorized tunnel and a method thereof.

The technical problems to be solved by the present disclosure are not limited to the aforementioned problems, and any other technical problems not mentioned herein will be clearly understood from the following description by those skilled in the art to which the present disclosure pertains. Furthermore, it may be easily seen that purposes and advantages of the present disclosure may be implemented by means indicated in claims and a combination thereof.

Technical Solution

According to an aspect of the present disclosure, a terminal may include a communication circuitry, a processor operatively connected with the wireless communication circuitry, and a memory operatively connected with the processor and storing a target application and an access control application. The memory may store instructions, when executed by the processor, causing the terminal to request network access of the target application from a server and receive tunnel information and authentication information, by means of the access control application, insert the authentication information into a transmission control protocol (TCP) packet and transmit the TCP packet to a gateway through a tunnel generated by the tunnel information, by means of the access control application, and transmit a data packet, when a TCP session is established.

In an embodiment of the present disclosure, the instructions may cause the terminal to insert the authentication information into the TCP packet and transmit the TCP packet to the gateway, when requesting to release the TCP session and delete the authentication information.

In an embodiment of the present disclosure, the authentication information may be header information of data flow.

In an embodiment of the present disclosure, the instructions cause the terminal to insert the header information into a payload of the TCP packet or insert the header information into an IP header of the TCP packet.

According to another aspect of the present disclosure, a gateway may include a communication circuitry and a processor that controls the communication circuitry to receive tunnel information and authentication information from a server and receive a TCP packet from a terminal through a tunnel corresponding to the tunnel information, authenticates the TCP packet based on the authentication information, and determines whether to generate a TCP session based on the authenticated result.

In an embodiment of the present disclosure, the processor may drop the TCP packet, when the authenticated result fails, and may transmit the TCP packet to a destination node, when the authenticated result succeeds.

In an embodiment of the present disclosure, the processor may delete authentication information received from the server, when the authenticated result succeeds.

In an embodiment of the present disclosure, the processor may compare the authentication information received from the server with authentication information inserted into the TCP packet received from the terminal to determine whether to perform authentication.

According to another aspect of the present disclosure, a method for controlling network access in a terminal may include requesting, by a target application of a terminal, network access from a server, receiving, by the terminal, tunnel information and authentication information from the server by means of an access control application, inserting, by the terminal, the authentication information into a transmission control protocol (TCP) packet and transmitting, by the terminal, the TCP packet to a gateway through the tunnel generated by the tunnel information, by means of the access control application, and transmitting, by the target application of the terminal, a data packet, when a TCP session is established.

An embodiment of the present disclosure may further include inserting, by the terminal, the authentication information into the TCP packet and transmitting, by the terminal, the TCP packet to the gateway through the tunnel, by means of the access control application, when requesting to release the TCP session of the target application and deleting, by the terminal, the authentication information.

An embodiment of the present disclosure may insert the header information into a payload of the TCP packet or may insert the header information into an IP header of the TCP packet.

According to another aspect of the present disclosure, a method for controlling network access in a gateway may include receiving, by a gateway, tunnel information and authentication information from a server, receiving, by the gateway, a TCP packet from a terminal through a tunnel corresponding to the tunnel information, authenticating, by the gateway, the TCP packet based on the authentication information, and determining, by the gateway, whether to generate a TCP session based on the authenticated result.

An embodiment of the present disclosure may include dropping the TCP packet, when the authenticated result fails, and transmitting the TCP packet to a destination node, when the authenticated result succeeds.

An embodiment of the present disclosure may delete the authentication information received from the server, when the authenticated result succeeds.

An embodiment of the present disclosure may include comparing the authentication information received from the server with authentication information inserted into the TCP packet received from the terminal, determining that authentication succeeds, when identical to each other, and determining that authentication fails, when not identical to each other.

Advantageous Effects

The system for controlling the network access according to an embodiment of the present disclosure may authenticate a TCP session in a process of generating the TCP session between a terminal and a gateway (or a server), and may determine whether to generate the TCP session based on the authenticated result, thus previously blocking a target application in a terminal from bypassing control of an access control application and transmitting a data packet to a destination network through an authorized tunnel.

MODE FOR INVENTION

Figure 1:
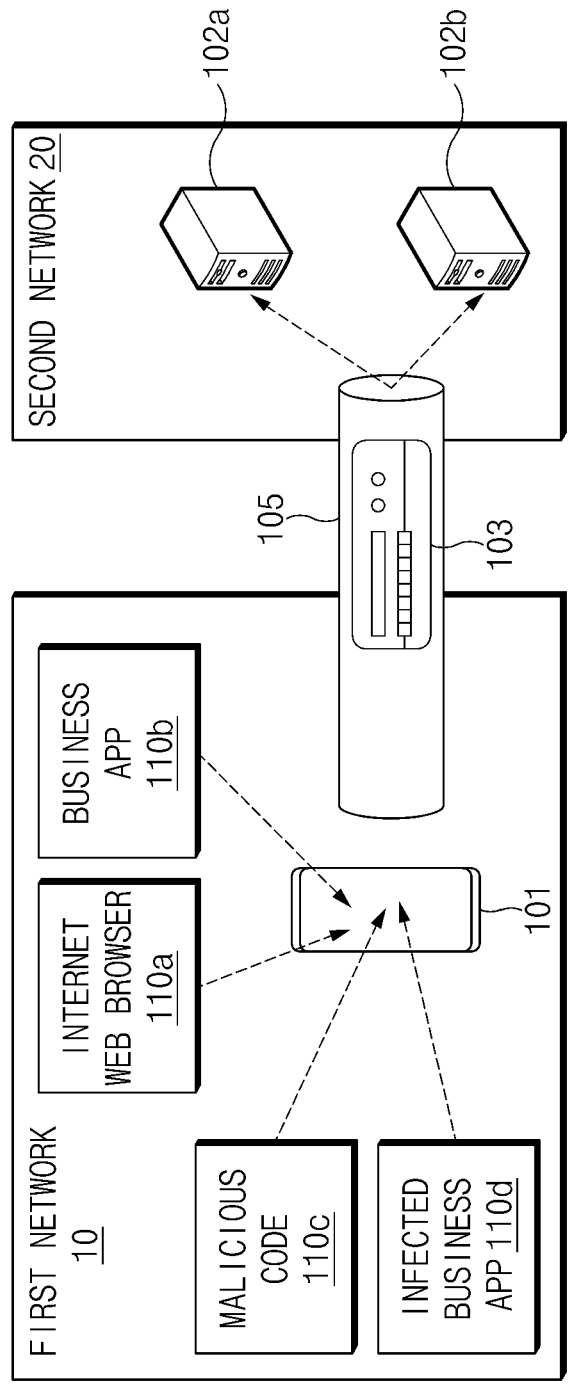
FIG. 1 is a drawing illustrating a network environment to which an embodiment of the present disclosure is applied.

Hereinafter, various embodiments of the disclosure may be described with reference to accompanying drawings. However, it should be understood that this is not intended to limit the present disclosure to specific implementation forms and includes various modifications, equivalents, and/or alternatives of embodiments of the present disclosure.

A singular form of a noun corresponding to an item in the present disclosure may include one or plural of the items, unless the relevant context clearly indicates otherwise. In the present disclosure, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Each (e.g., a module or a program) of components described in the present disclosure may include singular or plural entities. According to various embodiments, one or more of corresponding components or operations may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As used in the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in the form of an application-specific integrated circuit (ASIC).

Various embodiments of the present disclosure may be implemented as software (e.g., a program or an application) including instructions that are stored in a machine-readable storage medium (e.g., a memory). For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semipermanently stored in the storage medium and where data is temporarily stored in the storage medium.

A method according to various embodiments disclosed in the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least a part of the computer program product may be temporarily generated or at least temporarily stored in the machine-readable storage medium, such as a memory of the manufacturer's server, a server of the application store, or a relay server.

FIG. 1 is a drawing illustrating a network environment to which an embodiment of the present disclosure is applied.

In FIG. 1, a first network 10 and a second network 20 may be different networks. For example, the first network 10 may be a public network such as the Internet, and the second network 20 may be a private network such as an intranet or a VPN.

The first network 10 may include a terminal 101. In FIG. 1 and embodiments described below, the 'terminal' may be various types of devices capable of performing data communication. For example, the terminal 101 may be include a portable device, such as a smartphone and a tablet, a computer device, such as a desktop or a laptop, a multimedia device, a medical device, a camera, a wearable device, a virtual reality (VR) device, or a home appliance, but not limited to the above-mentioned devices. The terminal 101 may be referred to as an 'electronic device' or a 'node'.

The terminal 101 may attempt to access the second network 20 and may transmit data to servers 102*a* and 102*b* included in the second network 20. The terminal 101 may transmit data to the servers 102*a* and 102*b* through a gateway 103 and a tunnel 105. Although the example in which the second network 20 includes only the server is shown in FIG. 1, but the second network 20 may further include an electronic device such as the terminal 101.

When access to the first network 10 of the terminal 101 is granted, because the terminal 101 is able to communicate with all servers included in the first network 10, it may be exposed from an attack of a malicious program. For example, the terminal 101 may receive a malicious code 110*c* or data of an untrusted or insecure application, such as an infected business application 110*d*, as well as an Internet web browser 110*a* or a trusted and/or secure application, such as a business application 110*b*.

The terminal 101 infected from the malicious program may attempt to access the second network 20 and/or transmit data to the second network 20. When the second network 20 is established based on an IP like a VPN, it may be difficult for the second network 20 to separately monitor a plurality of devices included in the second network 20 and the second network 20 may be vulnerable to security for an application layer or a transport layer in an OSI layer. Furthermore, when the terminal 101 includes a malicious application after the tunnel is generated in advance, data of the malicious application may be transmitted to another electronic device in the second network 20.

Figure 2:
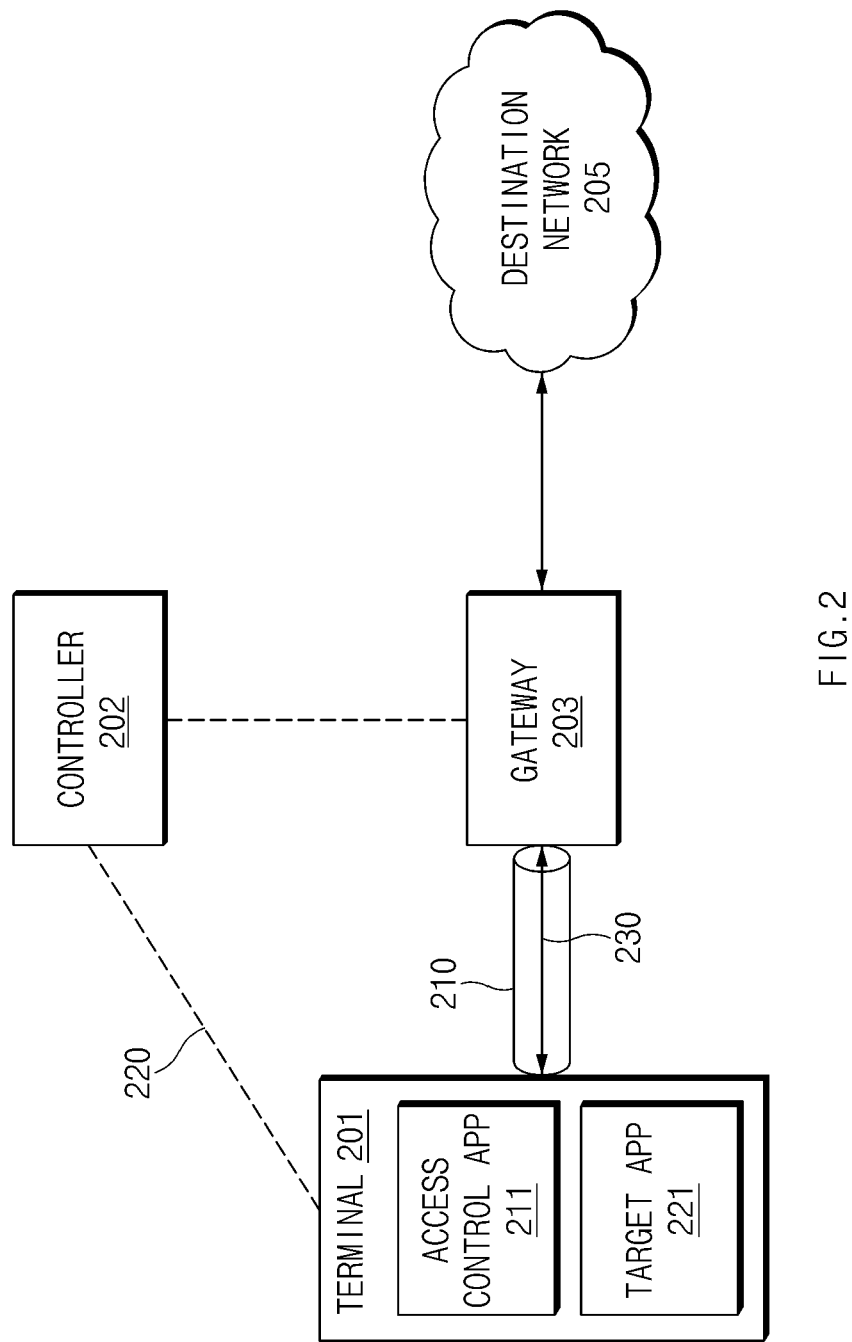
FIG. 2 is a drawing illustrating a configuration of a system for controlling network access according to an embodiment of the present disclosure.

FIG. 2 is a drawing illustrating a configuration of a system for controlling network access according to an embodiment of the present disclosure.

As shown in FIG. 2, the system for controlling the network access according to an embodiment of the present disclosure may include a terminal 201, a controller 202, and a gateway 203. The number of the terminals 201, the gateways 203, and destination networks 205 is not limited to the number shown in FIG. 2. For example, the terminal 201 may transmit a data packet to a plurality of destination networks through a plurality of gateways, and the controller 202 may manage the plurality of terminals and gateways. The terminal 201 may perform a function of a terminal 101 shown in FIG. 1. The gateway 203 may perform a function of a gateway 103 shown in FIG. 1. The destination network 205 may have the same or similar structure to a first network 10 or a second network 20 of FIG. 1.

The controller 202 may be implemented as, for example, a control server (or a cloud server). The controller 202 may manage data transmission among the terminal 201, the gateway 203, and another network (e.g., the destination network 205) to ensure reliability of the data transmission in a network environment. For example, the controller 202 may manage access of the terminal 201 to the destination network 205 by means of policy information or blacklist information, may mediate generation of an authorized tunnel 210 between the terminal 201 and the gateway 203, or may remove the tunnel 210 depending on a security event collected from the terminal 201 or the gateway 203. The terminal 201 may communicate with the destination network 205 through only the authorized tunnel 210 by the controller 202. When there is no the authorized tunnel 210, access of the terminal 201 to the destination network 205 may be blocked. According to an embodiment, the controller 202 may transmit and receive a control data packet with the terminal 201 to perform various operations (e.g., registration, grant, authentication, update, and end) associated with network access of the terminal 201. Flow in which the control data packet is transmitted may be referred to as control flow.

The controller 202 may further include communication circuitry (e.g., communication circuitry 430 of FIG. 4) for performing communication with an external electronic device (e.g., a terminal 201 or a gateway 203 of FIG. 2) and a processor (e.g., a processor 410 of FIG. 4) for controlling the overall operation of the controller 202.

The controller 202 may provide the terminal 201, the gateway 203, and a server in the destination network 205 with authentication information (e.g., header information of data flow) used to authenticate a TCP session.

Figure 3:
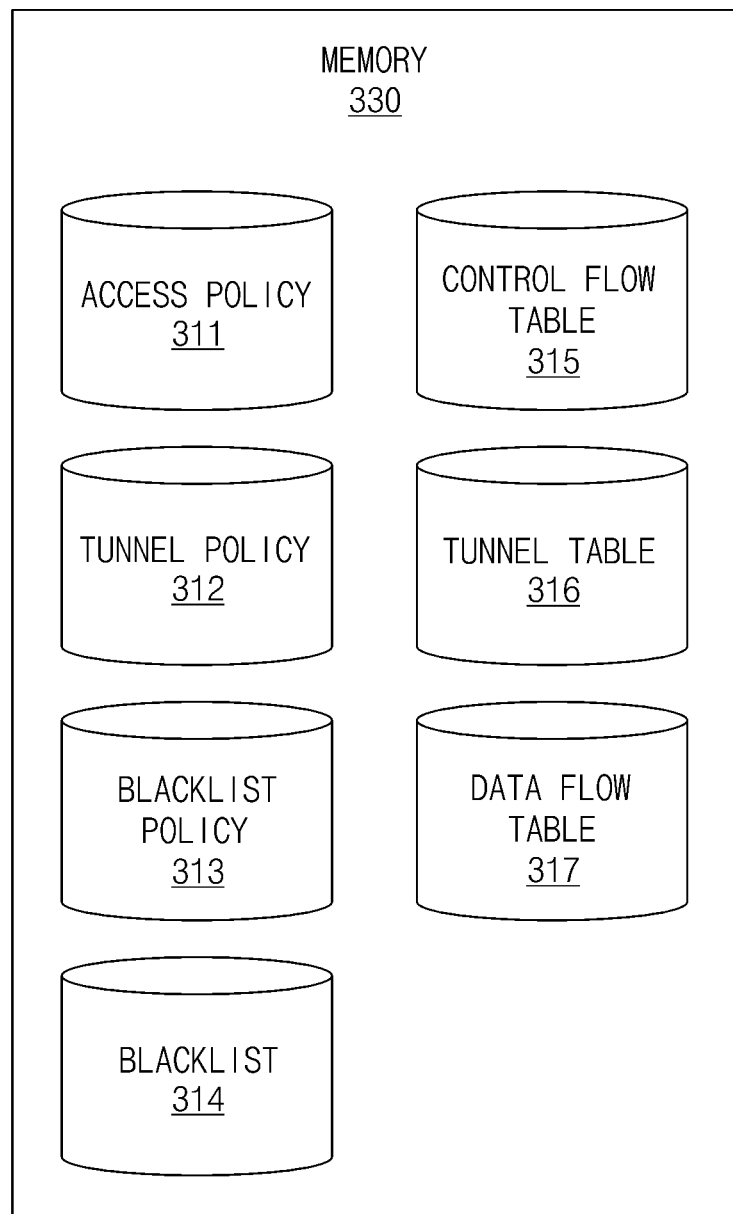
FIG. 3 is a drawing illustrating a database provided in a controller of a system for controlling network access according to an embodiment of the present disclosure.

The controller 202 may provide the terminal 201, the gateway 203, and the server of the destination network 205 with a tunnel table 316 and a data flow table 317 shown in FIG. 3.

In a process of generating (connecting) a TCP session with the server in the destination network 205 to communicate with the destination network 205 through the authorized tunnel 210, the terminal 201 may insert and transmit authentication information used to authenticate the TCP session into a payload of a TCP packet (or segment) to the server in the destination network 205. When the terminal 200 generates the TCP session with the server in the destination network 500 in a "3 way Handshake" scheme, the TCP packet may include a SYN packet (a session generation request packet) and an ACK packet (a response packet). When the terminal 201 releases the TCP session with the server in the destination network 500 in a "4 way Handshake" scheme, the TCP packet may include a FIN packet (a session end request packet). The terminal may insert authentication information into an IP header without inserting the authentication information into the payload of the TCP packet (or segment).

The gateway 203 may be located on a boundary of a network to which the terminal 201 belongs or a boundary of the destination network 205. The gateway 203 may be plural in number. The gateway 203 may forward a data packet received through the authorized tunnel 210 among data packets received from the terminal 201 to the destination network 205. Flow (e.g., 230) in which a data packet is transmitted between the terminal 201 and the gateway 203 or between the gateway 203 and the destination network 205 may be referred to as data flow. According to an embodiment, the gateway 203 may be connected with the controller 202 based on a cloud. The gateway 203 may generate the authorized tunnel 210 with the terminal 201 under control of the controller 202.

The gateway 203 may forward only a TCP packet into which the authentication information is inserted among TCP packets received through the authorized tunnel 210 to the destination network 205. At this time, for the destination network 205 in which there is no the gateway 203, the authorized tunnel 210 may be generated between the terminal 201 and the server in the destination network 205, and the server in the destination network 205 may receive the TCP packet into which the authentication information is inserted among TCP packets received through the authorized tunnel 210 and may drop a TCP packet into which the authentication information is not inserted.

The gateway 203 may further include communication circuitry (e.g., communication circuitry 430 of FIG. 4) for performing communication with an external electronic device (e.g., a terminal 201 of FIG. 2 or a server) and a processor (e.g., a processor 410 of FIG. 4) for controlling the overall operation of the gateway 203. At this time, the processor may control respective components making up the gateway 203.

The terminal 201 may include an access control application 211 for managing network access of an application stored in the terminal 201 and a network driver (not shown). For example, when an access event of a target application 221 (e.g., any one of applications 110*a* to 110*d* of FIG. 1) included in the terminal 201 to the destination network 205 occurs, the access control application 211 may determine whether access of the target application 221 is possible. When the access of the target application 221 is possible, the access control application 211 may transmit a data packet to the gateway 203 through the tunnel 210. The access control application 211 may control transmission of a data packet by means of a kernel including an operating system in the terminal 201 and a network driver. The access control application 211 may play a role as a kind of agent.

FIG. 3 is a drawing illustrating a database provided in a controller of a system for controlling network access according to an embodiment of the present disclosure.

As shown in FIG. 3, respective databases 311 to 317 provided in the controller of the system for controlling the network access according to an embodiment of the present disclosure may be stored in a memory 330. Such databases 311 to 317 may be used to control a network access process and a data packet transmission process.

The access policy database 311 may include information about an identified network, a network accessible by a terminal, a user or an application, and/or a service. For example, when access to a destination network is requested from the terminal, a controller may determine whether the identified network (e.g., the network to which the terminal belongs), the terminal, the user (e.g., the user of the terminal), and/or the application (e.g., the application included in the terminal) is accessible to the destination network based on the access policy database 311.

The tunnel policy database 312 may include a type of a tunnel to be connected to a gateway or a destination node (e.g., a server in a destination network 205) which is present on a boundary between a source node (e.g., the terminal) and the network on a connection path, an encryption method, and encryption level information. For example, when access to the destination network is requested from the terminal, the controller may provide the terminal with an optimal tunnel for accessing the destination network and information about it based on the tunnel policy database 312.

The blacklist policy database 313 may include a policy for permanently or temporarily blocking access of a specific terminal. The blacklist policy database 313 may be generated based on a risk level of a security event among security events collected on a periodic basis from the terminal or the gateway, a cycle of occurrence, and/or information identified by means of an action analysis (e.g., at least one of a terminal identifier (ID), an IP address, a media access control (MAC) address, a user ID).

The blacklist database 314 may include a list of at least one of a terminal, an IP address, a MAC address, or a user blocked by the blacklist policy database 313. For example, when identification information of the terminal requesting access to the destination network is included in the blacklist database 314, the controller may deny the access request of the terminal to separate the terminal from the destination network.

The control flow table 315 is an example of a session table for managing flow (e.g., control flow) of a control data packet generated between the terminal and the controller. When the terminal successfully accesses the controller, control flow information may be generated by the controller. The control flow information may include at least one of identification information of control flow, an IP address identified when accessing and authenticating the controller, a terminal ID, or a user ID. For example, when access to the destination network is request from the terminal, the controller may search for control flow information by means of the control flow identification information received from the terminal and may map at least one of the IP address, the terminal ID, or the user ID included in the found control flow information to the access policy database 311, thus determining whether access of the terminal is possible and whether to generate a tunnel.

According to an embodiment, the control flow may have an expiration time. The terminal should update the expiration time of control flow. When the expiration time is not updated during a certain time, the control flow (or control flow information) may be removed. Furthermore, when it is determined to need to immediately block access depending on a security event collected from the terminal or the gateway, the controller may remove the control flow depending on an access end request of the terminal. When the control flow is removed, because the tunnel and the data flow, which are previously generated, are also removed, access of the terminal to a network may be blocked.

The tunnel table 316 may be a table for managing a tunnel connected between the terminal and the gateway or a destination node. The tunnel may be generated for, for example, each device or IP. When a tunnel is generated between the terminal and the gateway, the tunnel table 316 may include tunnel identification information, control flow identification information when the tunnel is dependent on control flow, a tunnel end point (TEP), a tunnel start point (TSP), a tunnel algorithm, a tunnel type, and/or additional information for managing the tunnel.

The data flow table 317 may be a table for managing flow (e.g., data flow) in which a detailed data packet is transmitted between the terminal and the gateway or the destination node. The data flow may be generated for each TCP session in the tunnel, for each application of a source terminal, or in a more detailed unit. The data flow table 317 may include data flow identification information, control flow identification (ID) information when data flow is dependent on control flow, authentication information (e.g., header information of the data flow) used to authenticate a TCP session, a tunnel ID corresponding to each data flow, an application ID for identifying data flow of an authorized target, a destination IP address, and/or a service port.

Figure 4:
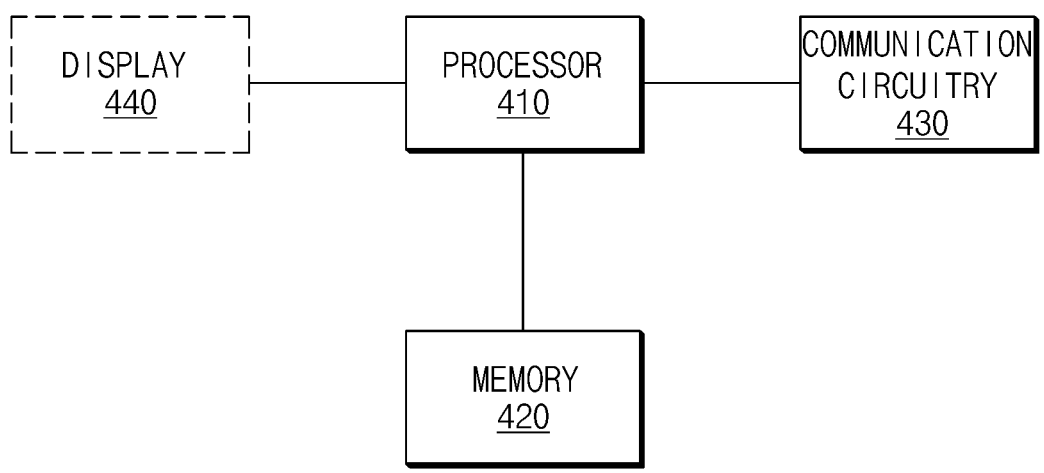
FIG. 4 is a drawing illustrating a configuration of a terminal of a system for controlling network access according to an embodiment of the present disclosure.

FIG. 4 is a drawing illustrating a configuration of a terminal of a system for controlling network access according to an embodiment of the present disclosure.

As shown in FIG. 4, a terminal 201 of the system for controlling the network access according to an embodiment of the present disclosure may include a processor 410, a memory 420, and communication circuitry 430. Furthermore, the terminal 201 may further include a display 440 for performing an interface with a user.

The processor 410 may control the overall operation of the terminal 201. The processor 410 may include one processor single core or may include a plurality of cores. For example, the processor 410 may include a multi-core such as a dual-core, a quad-core, or a hexa-core. According to embodiments, the processor 410 may further include a cache memory located internally or externally. According to various embodiments, the processor 410 may be configured with a plurality of processors. For example, the processor 410 may include at least one of an application processor, a communication processor, or a graphical processing unit (GPU).

All or a portion of the processor 410 may be electrically or operatively combined or connected with another component (e.g., the memory 420, the communication circuitry 430, or the display 440) in the terminal. The processor 410 may receive commands of other components of the terminal, may interpret the received commands, and may perform calculation or may process data, depending on the analyzed commands. The processor 410 may interpret and process a message, data, an instruction, or a signal received from the memory 420, the communication circuitry 430, or the display 440. The processor 410 may generate a new message, data, instruction, or signal based on the received message, data, instruction, or signal. The processor 410 may provide the memory 420, the communication circuitry 430, or the display 440 with the processed or generated message, data, instruction, or signal.

The processor 410 may process data or a signal which is generated or occurs by a program. For example, the processor 410 may request an instruction, data, or a signal from the memory 420 to run or control the program. The processor 410 may record (or store) or update an instruction, data, or a signal in the memory 420 to run or control the program.

The memory 420 may store an instruction controlling the terminal, a control instruction code, control data, or user data. For example, the memory 420 may include at least one of an application program, an operating system (OS), middleware, or a device driver.

The memory 420 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like.

The memory 420 may further include a non-volatile medium such as a hard disk drive (HDD), a solid state disk (SSD), an embedded multi media card (eMMC), or a universal flash storage (UFS).

According to an embodiment, the memory 420 may store some of pieces of information included in a memory (e.g., a memory 330 of FIG. 3) of the controller. For example, the memory 420 may store a tunnel table 316 and a data flow table 317 described in FIG. 3.

The communication module 430 may assist in establishing a wired or wireless communication connection between the terminal and an external electronic device (e.g., a controller 202 of FIG. 2, a gateway 203 of FIG. 2, or a server in a destination network 205 of FIG. 2) and performing communication through the established connection. According to an embodiment, the communication circuitry 430 may include wireless communication circuitry (e.g., cellular communication circuitry, short range wireless communication circuitry, or global navigation satellite system (GNSS) communication circuitry) or wired communication circuitry (e.g., local area network (LAN) communication circuitry or power line communication circuitry) and may communicate with the external electronic device over a short range communication network, such as Bluetooth, WiFi direct, or infrared data association (IrDA), or a long range communication network, such as a cellular network, the Internet, or a computer network using the corresponding communication circuitry among them. The above-mentioned several types of communication circuitry 430 may be implemented as one chip or may be respectively implemented as separate chips.

The display 440 may output content, data, or a signal. The display 440 may display image data processed by the processor 410. The display 440 may be combined with a plurality of touch sensors (not shown) capable of receiving a touch input or the like to be configured as an integrated touch screen. When the display 440 is configured with the touch screen, the plurality of touch sensors may be arranged over the display 440 or under the display 440.

Figure 5:
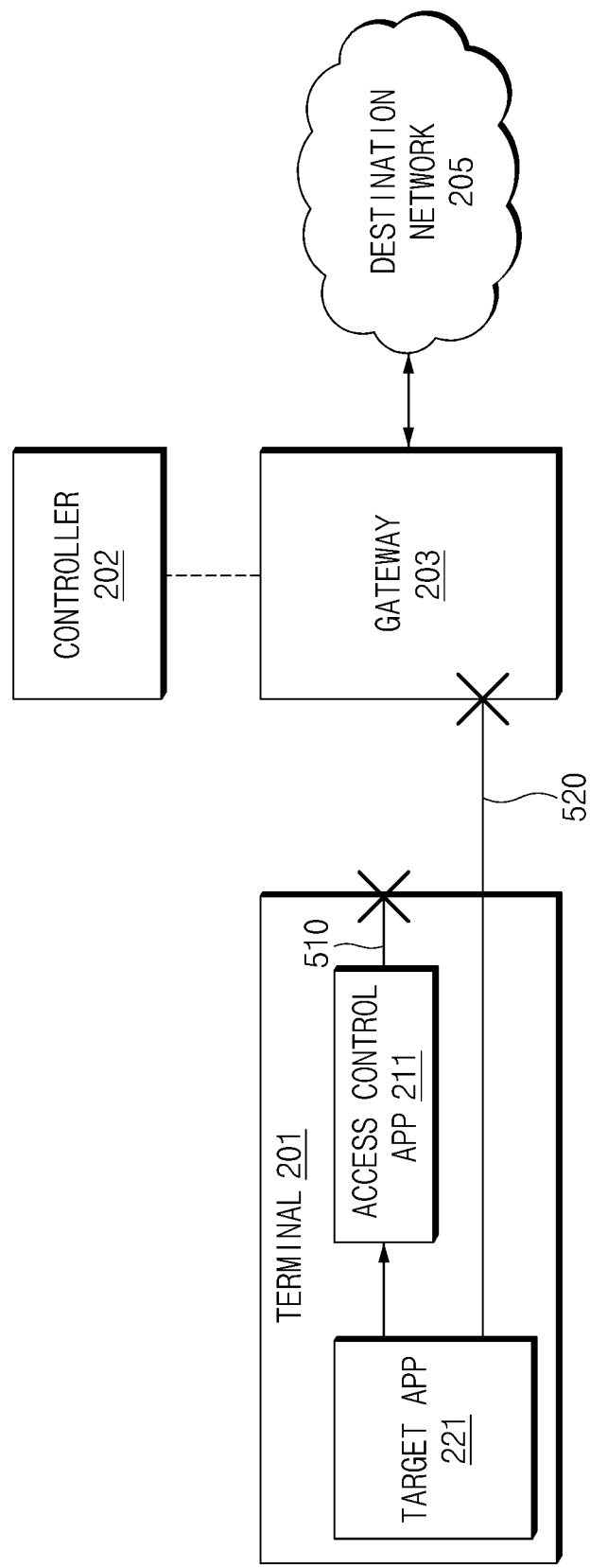
FIG. 5 is a drawing illustrating an operation of a system for controlling network access according to an embodiment of the present disclosure.

FIG. 5 is a drawing illustrating an operation of a system for controlling network access according to an embodiment of the present disclosure.

As shown in FIG. 5, an access control application 211 which operates in a terminal 201 may detect an access request of a target application 221 to a destination network 205 and may determine whether the terminal 201 or the target application 221 accesses the controller 202. When the terminal 201 or the target application 221 does not access the controller 202, a kernel stage of an operating system or a network driver may block transmission of a data packet (operation 510). By means of the access control application 211, the terminal 201 may previously block access of a malicious application on an application layer in an OSI layer.

According to another embodiment, when the access control application 211 is not installed in the terminal 201 or when the malicious application bypasses control of the access control application 211, an unauthorized data packet may be transmitted from the terminal 201. In this case, because a gateway 203 which is present on a boundary of a network blocks a data packet received through an unauthorized tunnel (operation 520), a data packet transmitted from the terminal 201 (e.g., a data packet for generating a TCP session) may fail to arrive at the destination network 205. In other words, the terminal 201 may be separated from the destination network 205.

Figure 6:
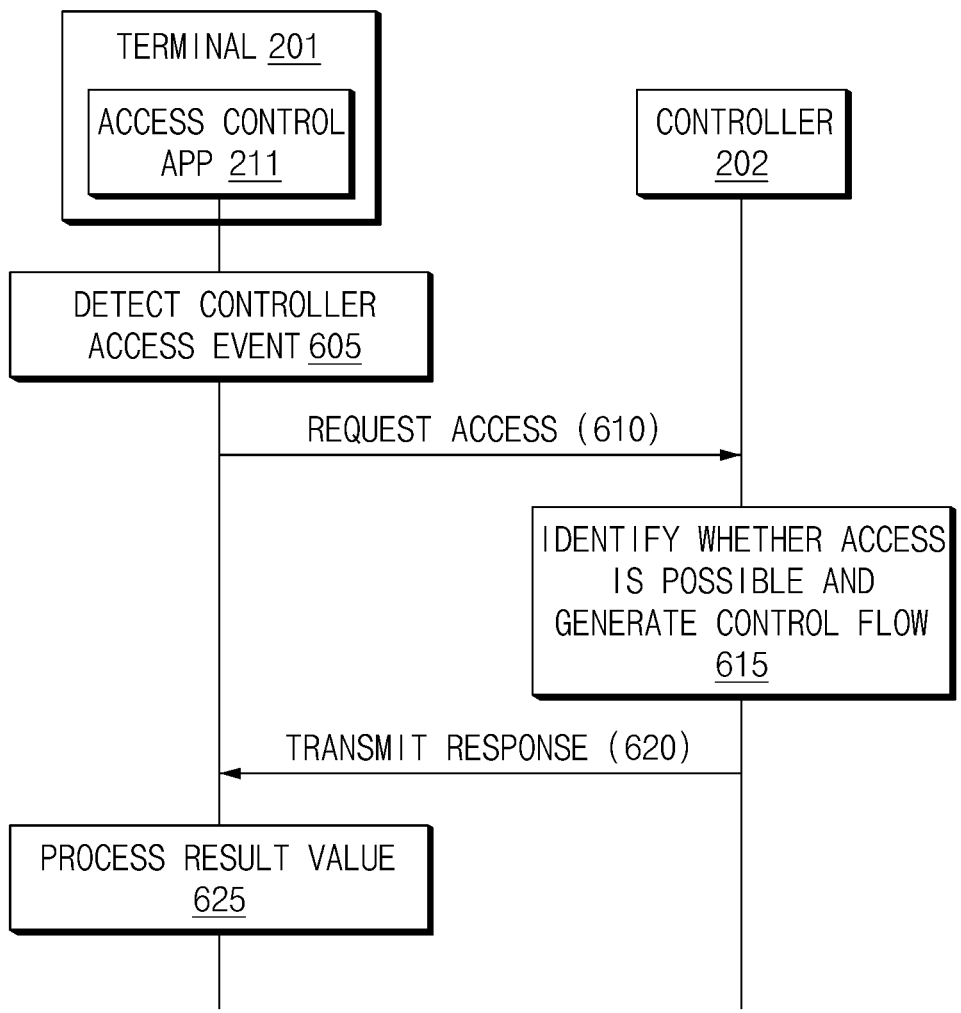
FIG. 6 is a signal sequence diagram illustrating a process where a terminal access a controller in a system for controlling network access according to an embodiment of the present disclosure.

FIG. 6 is a signal sequence diagram illustrating a process where a terminal access a controller in a system for controlling network access according to an embodiment of the present disclosure.

For a terminal 201 to access a destination network 205, because there is a need to be authorized by a controller 202, an access control application 211 of the terminal 201 may attempt to access of the terminal 201 to the controller 202 by requesting the controller 202 to generate control flow.

In operation 605, the terminal 201 may detect a controller access event. For example, the access control application 211 is installed and run in the terminal 201, and the terminal 201 may detect that access to the controller 202 is requested by means of the access control application 211.

Figure 7:
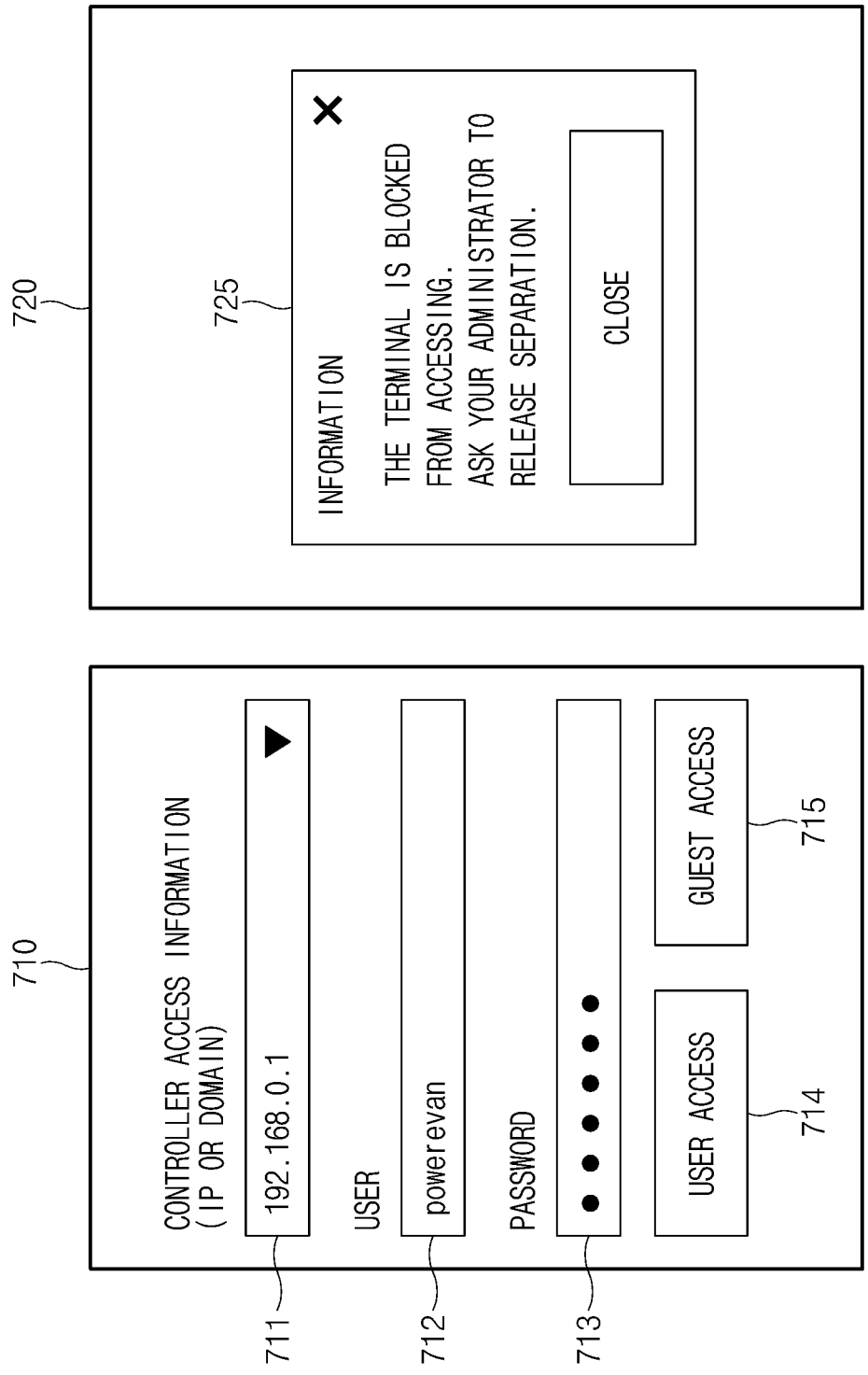
FIG. 7 is a drawing illustrating a user interface screen where a terminal accesses a controller in a system for controlling network access according to an embodiment of the present disclosure.

As an example, referring to FIG. 7, when the access control application 211 is run, the terminal 201 may display a user interface screen 710 for receiving necessary information for controller access. The user interface screen 710 may include an input window 711 for inputting an IP or a domain of the controller 202, an input window 712 for inputting a user ID, and/or an input window 713 for inputting a password. By receiving a button 714 for controller access of an authenticated user after pieces of information about the input windows 711 to 713 are input, the terminal 201 may detect the controller access event. As another example, when the user authentication of the terminal 201 is not completed yet, the terminal 201 may detect the controller access event by receiving a button 715 for controller access of an unauthorized user (i.e., a guest).

In operation 610, the terminal 201 may request controller access from the controller 202 in response to detecting the controller access event. The terminal 201 may request the controller access by means of the access control application 211. According to an embodiment, the access control application 211 may transmit identification information (e.g., a terminal ID, an IP address, or a MAC address) of the terminal 201, a type of the terminal 201, a location of the terminal 201, an environment of the terminal 201, identification information of a network to which the terminal 201 belongs, and/or identification information of the access control application 211 to the controller 202.

In operation 615, the controller 202 may identify whether access of the terminal 201 is possible in response to the received request. According to an embodiment, the controller 202 may identify whether the access of the terminal 201 is possible based on a database included in a memory 330. For example, the controller 202 may identify whether the access of the terminal 201 is possible based on whether information received from the access control application 211 is included in an access policy database and whether identification information of the terminal 201 and/or a network to which the terminal 201 belongs is included in a blacklist database.

When the access of the terminal 201 is possible, the controller 202 may generate control flow between the terminal 201 and the controller 202. In this case, the controller 202 may generate control flow identification information in the form of a random number and may store the identification information of the terminal 201 and/or the network to which the terminal 201 belongs in a control flow table. Information (e.g., control flow identification information and/or control flow information) stored in the control flow table 315 may be used to authenticate a user of the terminal 201, update information of the terminal 201, identify a policy for network access of the terminal 201, and/or check validity.

When the control flow is generated, in operation 620, the controller 202 may transmit a response to the controller access request to the terminal 201. In this case, the controller 202 may transmit the generated control flow identification information to the terminal 201.

In operation 625, the terminal 201 may process a result value depending on the received response. For example, the access control application 211 may store the received control flow identification information and may display a user interface screen indicating that the controller access is completed to a user. When the controller access is completed, a network access request of the terminal 201 for a destination network may be controlled by the controller 202.

According to another embodiment, the controller 202 may determine that the access of the terminal 201 is impossible. For example, when the identification information of the terminal 201 and/or the network to which the terminal 201 belongs is included in a blacklist database, the controller 202 may determine that the access of the terminal 201 is impossible. In this case, the controller 202 may fail to generate a control flow in operation 615 and may transmit a response indicating that the access of the terminal 201 is impossible in operation 620.

When receiving the response indicating that the access of the terminal 201 is impossible, in operation 625, the terminal 201 may output a user interface screen indicating that controller access is impossible to the user. For example, referring to FIG. 7, the terminal 201 may display a user interface screen 720 by means of the access control application 211. The user interface screen 720 may indicate that access of the terminal 201 is blocked and may include a user interface 725 guiding a manager (e.g., the controller 202) to release separation.

Figure 8:
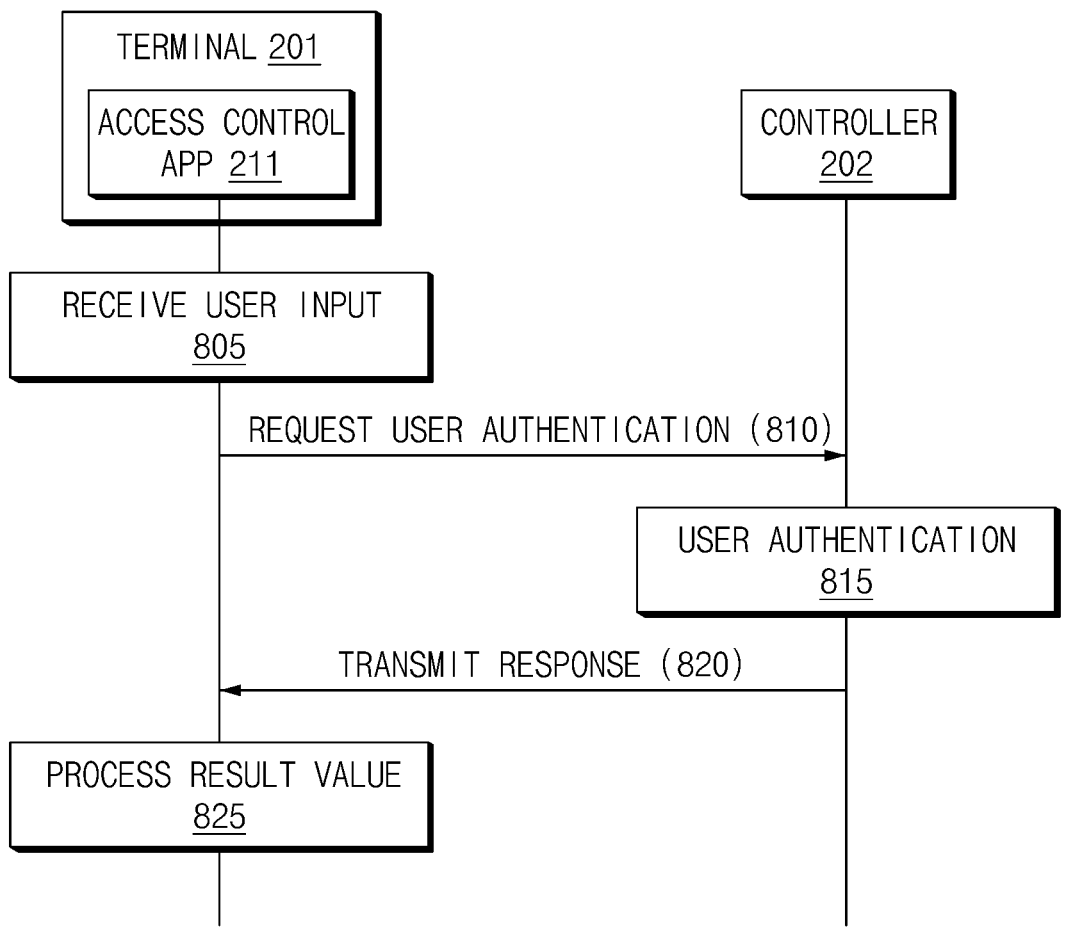
FIG. 8 is a signal sequence diagram illustrating a user authentication process in a system for controlling network access according to an embodiment of the present disclosure.

FIG. 8 is a signal sequence diagram illustrating a user authentication process in a system for controlling network access according to an embodiment of the present disclosure.

For a terminal 201 to obtain detailed access right for a destination network 205, an access control application 211 of the terminal 201 may receive authentication for a user of the terminal 201 from a controller 202.

In operation 805, the terminal 201 may receive an input for user authentication. The input for the user authentication may be, for example, a user input inputting a user ID and a password. For another example, the input for the user authentication may be a user input (e.g., biometric information) for more reinforced authentication.

In operation 810, the terminal 201 may request user authentication from the controller 202. For example, the access control application 211 may transmit input information for user authentication to the controller 202. When control flow between the terminal 201 and the controller 202 is generated in advance, the access control application 211 may transmit the input information for user authentication together with control flow identification information.

In operation 815, the controller 202 may authenticate a user based on information received from the terminal 201. For example, the controller 202 may determine whether the user is accessible depending on an access policy and whether the user is included in a blacklist based on a user ID, a password, and/or reinforced authentication information, which are included in the received information, and a database (e.g., an access policy database 311 or a blacklist database 314 of FIG. 3) included in a memory of the controller 202.

When the user is authenticated, the controller 202 may add identification information (e.g., a user ID) of the user to identification information of control flow. The added user identification information may be used for controller access or network access of the authenticated user.

In operation 820, the controller 202 may transmit information indicating that the user is authenticated as a response to the user authentication request to the terminal 201.

In operation 825, the terminal 201 may process a result value for the user authentication. For example, the terminal 201 may display a user interface screen indicating that the user authentication is completed to the user.

According to another embodiment, the controller 202 may determine that the user authentication is impossible. For example, when the identification information of the user is included in a blacklist database 314, the controller 202 may determine that the user authentication is impossible. In this case, in operation 820, the controller 202 may transmit information indicating that the user authentication is impossible to the terminal 201. In operation 825, the terminal 201 may display a user interface screen indicating that the user authentication fails.

Figure 9:
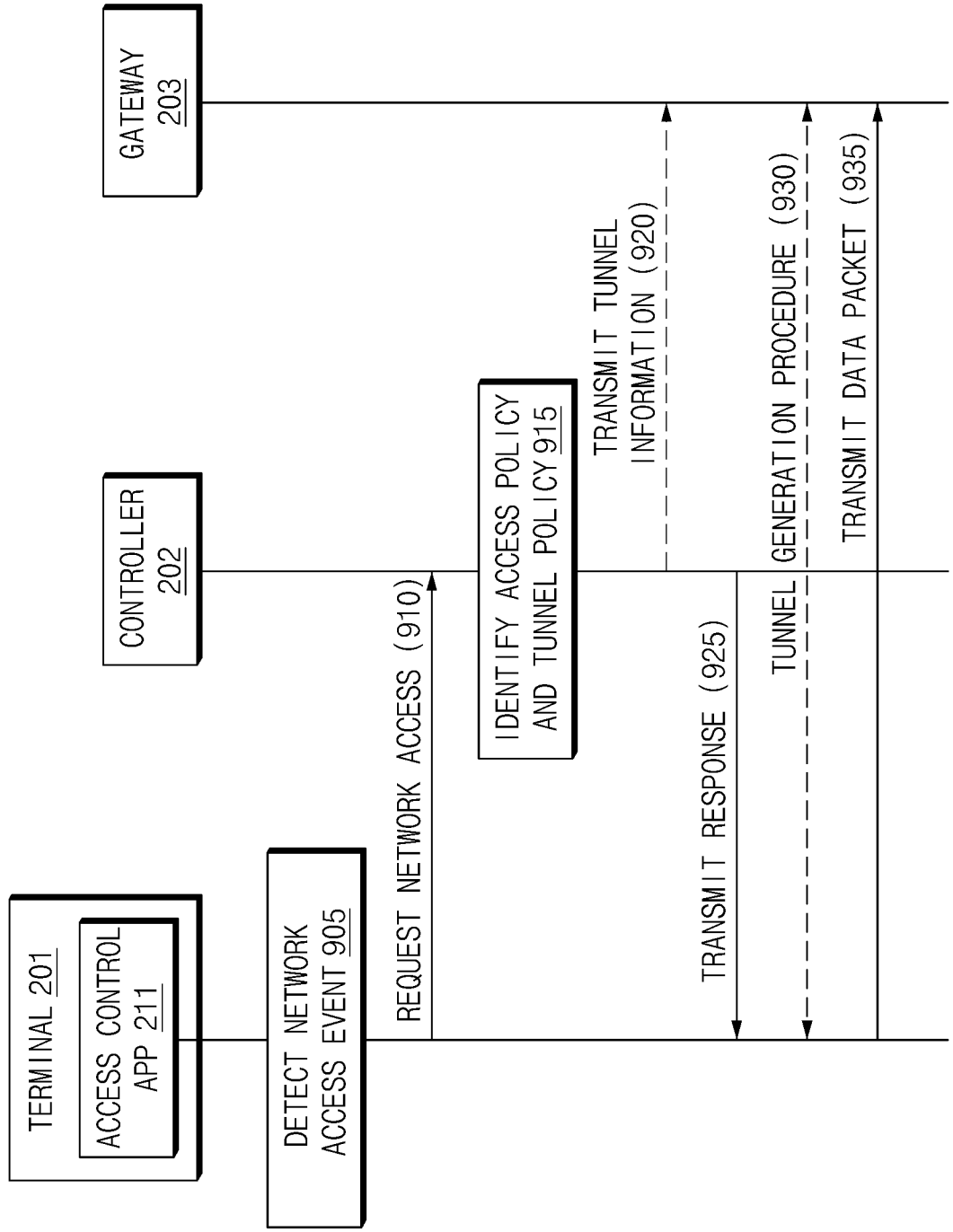
FIG. 9 is a signal sequence diagram illustrating a process of controlling network access of a terminal in a system for controlling network access according to an embodiment of the present disclosure.

FIG. 9 is a signal sequence diagram illustrating a process of controlling network access of a terminal in a system for controlling network access according to an embodiment of the present disclosure.

A terminal 201 authorized from a controller 202 may control network access of other applications (e.g., a target application 221) stored in the terminal 201 by means of an access control application 211 to ensure trusted data transmission.

In operation 905, the access control application 211 may detect a network access event. For example, the access control application 211 may detect that the target application 221 such as a web browser attempts to access a destination network 205 such as the Internet. For example, a user may run the web browser and may input and call a web address to be accessed.

In operation 910, the access control application 211 may request network access of the target application from the controller 202. In this case, the access control application 211 may transmit identification information of the target application 221, an IP of an access target, and service port information together with identification information of control flow generated between the terminal 201 and the controller 202 to the controller 202.

In operation 915, the controller 202 may identify an access policy and a tunnel policy based on the request received from the access control application 211. For example, the controller 202 may determine whether access of the target application is possible based on whether the information received from the access control application 211 meets the access policy of the controller 202. When the access of the target application 221 is impossible, in operation 925, the controller 202 may transmit information indicating the access is impossible to the terminal 201. In this case, the access control application 211 may drop a data packet of the target application 221 and may display a user interface screen indicating that access to a network is impossible.

When the access of the target application 221 is possible, the controller 202 may identify whether there is an authorized tunnel between the terminal 201 and a gateway 203. For example, the controller 202 may identify a tunnel end point (TEP) and/or a tunnel type in a tunnel policy corresponding to the destination network 205 and may determine whether there is an authorized tunnel corresponding to the identified TEP in a tunnel table. When there is the authorized tunnel, the controller 202 may generate a tunnel ID of a previously generated tunnel and information included in a data flow table and may transmit the generated information to the terminal 201 and the gateway 203 in operation 925. When there is no authorized tunnel, the controller 202 may generate information (e.g., a tunnel type, a scheme, authentication information, and/or an IP and a port of the TEP) necessary to generate a tunnel and information included in the data flow table and may transmit the generated information to the gateway 203 and the terminal 201 (operations 920 and 925).

For another example, when there is no tunnel meeting a tunnel policy among tunnels to be generated between the terminal 201 and the gateway 203, in operation 925, the controller 202 may notify the terminal 201 that network access is impossible. In this case, the access control application 211 may drop a data packet of the target application 221 and may display a user interface screen indicating that the network access is impossible.

Figure 10A:
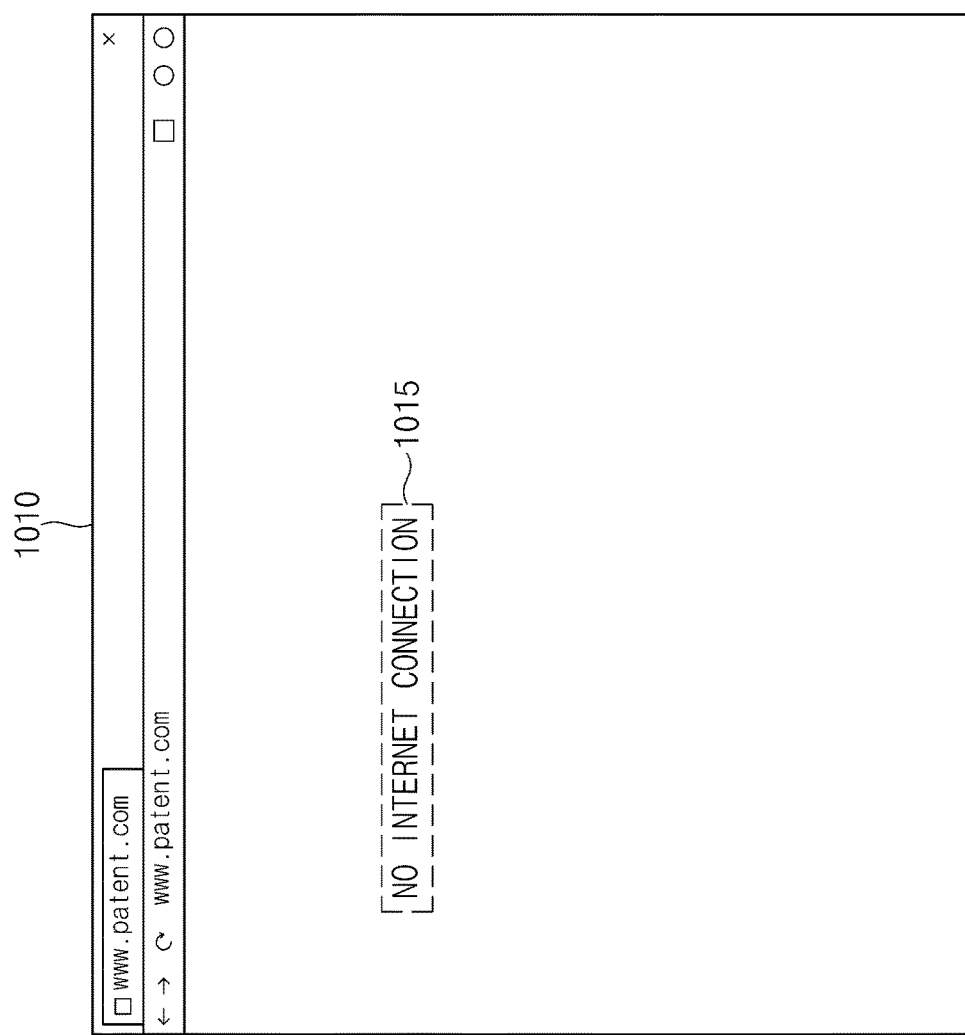
FIG. 10A is a drawing illustrating a user interface screen provided when blocking network access of a terminal in a system for controlling network access according to an embodiment of the present disclosure.

The access control application 211 may process a result value depending to a response received in operation 925. When receiving the information that the network access of the target application is impossible or the information that there is no authorized tunnel from the controller 202, the access control application 211 may drop a data packet and may output a user interface screen indicating that the network access is impossible. For example, referring to FIG. 10A, the terminal 201 may output a user interface screen 1010 or 1020 indicating that access to the destination network 205 is blocked on a display 440. The user interface screen 1010 or 1020 may include text 1015 or a pop-up window 1025 indicating that the access is blocked.

Figure 10B:
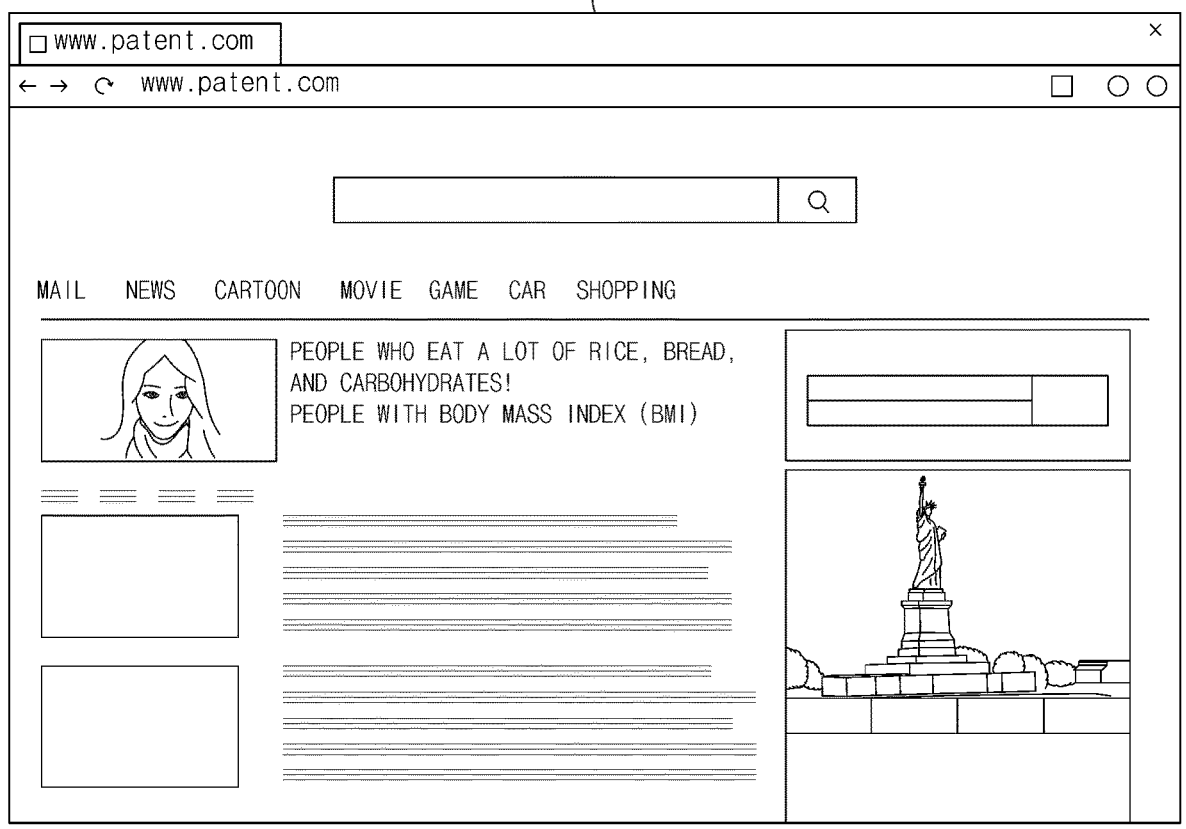
FIG. 10B is a drawing illustrating a user interface screen provided when granting network access of a terminal in a system for controlling network access according to an embodiment of the present disclosure.

When information necessary to generate a tunnel is received from the controller 202, the access control application 211 may generate the tunnel with the gateway 203 in operation 930 and may transmit a data packet of the target application 221 through the generated tunnel in operation 935. In this case, the access control application 211 may receive a data packet from the destination network and may process data provided from the destination network. For example, referring to FIG. 10B, the terminal 201 may output a screen 1030 provided from a destination network (e.g., a web site), access of which is granted, on a display.

When receiving a tunnel ID of a tunnel which is present in advance from the controller 202, the access control application 211 may fail to perform an additional tunnel generation procedure and may transmit a data packet of the target application to the gateway 203 through the tunnel corresponding to the tunnel ID in operation 935.

The access control application 211 may first identify whether there is an authorized tunnel between the target application and the gateway 203 on a boundary of the destination network before performing operation 910. For example, the access control application 211 may identify identification information of the target application, identification information (e.g., a destination IP) of the destination network, service port information, and authentication information (e.g., header information of data flow) and may identify whether there is a tunnel corresponding to the identified information in a data flow table stored in a memory of the terminal 201. When there is the authorized tunnel, in operation 935, the access control application 211 may transmit a data packet to the gateway 203 through the authorized tunnel without requesting network access. When there is no authorized tunnel, in operation 910, the access control application 211 may request network access.

To ensure integrity and stability of the target application, the access control application 211 may further check validity of the target application before requesting network access. For example, the access control application 211 may perform whether the target application is forged or falsified, code signing check, and/or fingerprint check. For another example, the access control application 211 may identify whether the target application 221, an access target IP, and a service port are accessible based on an access policy database 311 received from the controller 202. When it fails in checking the validity of the target application 221, the access control application 211 may drop a data packet without requesting network access. In this case, the access control application 211 may display a user interface screen indicating that the access is impossible. When it succeeds in checking the validity of the target application 221, in operation 910, the access control application 211 may request network access.

As shown in FIG. 9, when there is an authorized tunnel or a tunnel (an authorized tunnel) is generated under control of the controller 202 (930), the access control application 211 may transmit a data packet to the gateway 203 through the authorized tunnel. In this case, malware which is present in the terminal 201 may bypass control of the access control application 211 to transmit a data packet to the gateway 203 through the authorized tunnel.

Hereinafter, the process of preventing it will be described in detail with reference to FIGS. 11 and 12.

Figure 11:
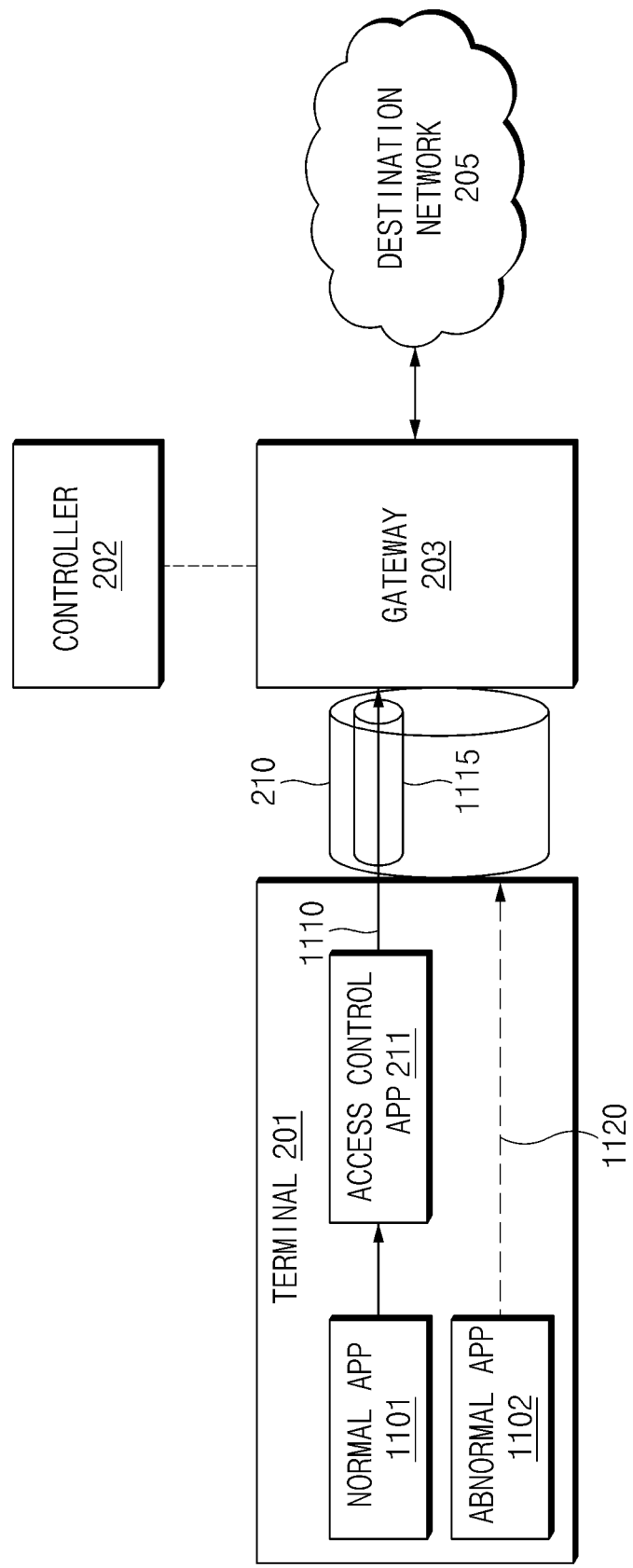
FIG. 11 is another drawing illustrating an operation of a system for controlling network access according to an embodiment of the present disclosure.

FIG. 11 is another drawing illustrating an operation of a system for controlling network access according to an embodiment of the present disclosure.

A normal application 1101 in a terminal 201 may transmit a data packet to a gateway 203 through an authorized tunnel 210 under control of an access control application 211. At this time, the access control application 211 may generate a TCP session 1115 with a destination node based on information (tunnel information and header information of data flow) transmitted from a controller 202 to facilitate transmission of a data packet.

In a state where the terminal 201 possesses the authorized tunnel 210, the case where an abnormal application 1102 bypasses control of the access control application 211 to transmit a data packet to the gateway 203 through the authorized tunnel 210 may occur. In this case, before transmitting the data packet to the gateway 203 through the authorized tunnel 210, the abnormal application 1102 should also generate a TCP session with the destination node.

Noted on this point, the present disclosure provides a method capable of basically blocking the abnormal application 1102 from transmitting a data packet to the gateway 203 through the authorized tunnel 210. In other words, the present disclosure may provide a method such that the TCP session is not generated with the destination node when not through the access control application 211.

Figure 12:
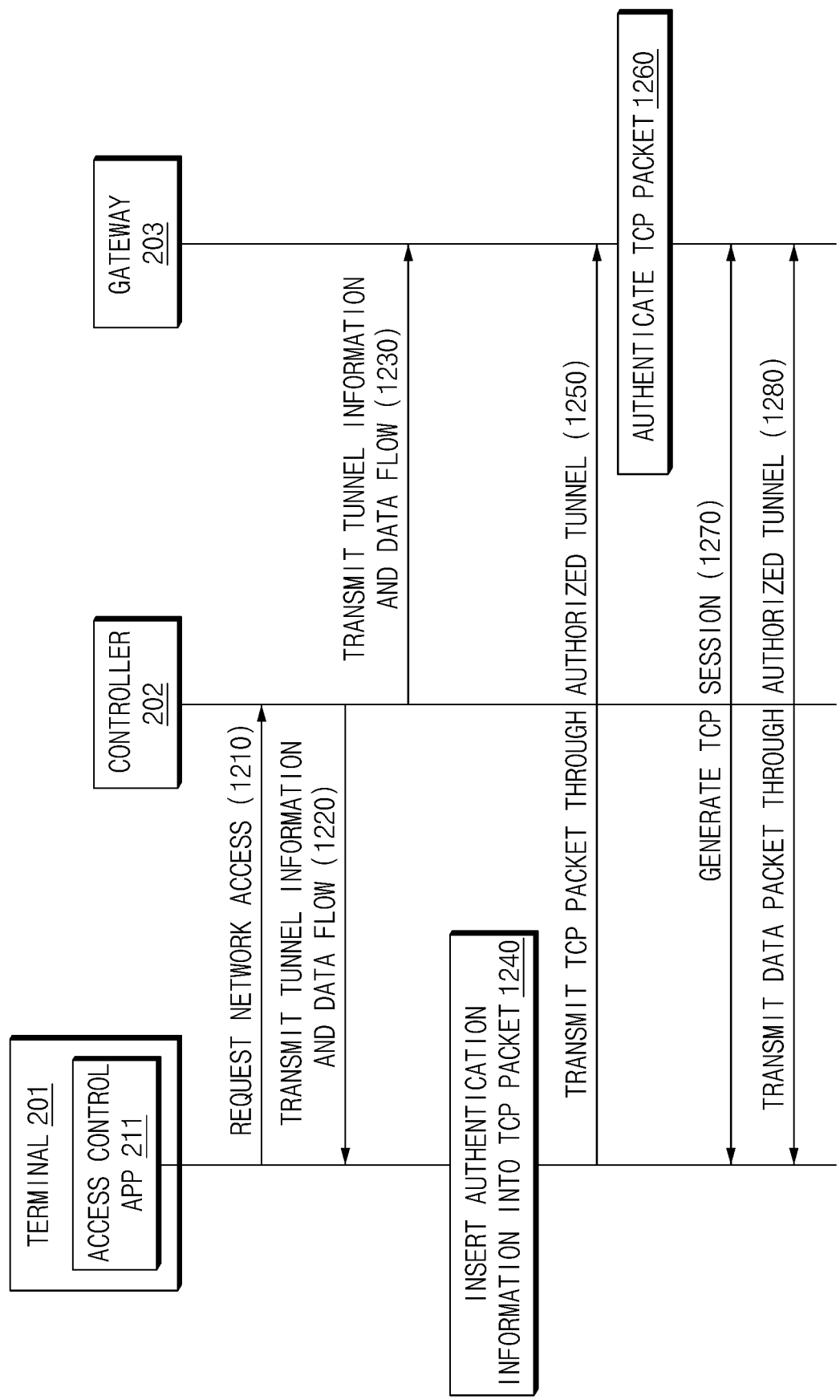
FIG. 12 is a signal sequence diagram illustrating a process of controlling network access of terminal in a system for controlling network access according to an embodiment of the present disclosure.

FIG. 12 is a signal sequence diagram illustrating a process of controlling network access of a terminal in a system for controlling network access according to an embodiment of the present disclosure.

When an access control application 211 of a terminal 201 requests network access from a controller 202 (1210), the controller 202 may perform an operation described in FIG. 9 and may transmit tunnel information and data flow (including header information as authentication information) to the access control application 211 and a gateway 203 (1220 and 1230). At this time, when the gateway 203 fails in receiving the tunnel information and the data flow, the controller 202 may notify the terminal 201 that network access is impossible. Furthermore, when there is no the gateway 203 and there is a server (a destination node) on a network the access control application 211 wants to access, authentication information may be transmitted to the server. Thereafter, an operation of the server may be the same as the operation of the gateway 203.

To generate a TCP session with the destination node, the access control application 211 may insert the authentication information (header information of the data flow) into a payload of a TCP packet (a SYN packet or an ACK packet) (1240) and may transmit the TCP packet to the gateway 203 through the authorized tunnel 210 (1250). At this time, the access control application 211 may insert the authentication information into an IP header without inserting the authentication information into the payload of the TCP packet.

The gateway 203 may authenticate the TCP packet to determine whether to generate a TCP session (1260). In other words, when the authentication is normally completed, the gateway 203 may transmit the TCP packet to the destination node such that the TCP session is generated (1270). Of course, when it fails in the authentication, the TCP packet may be dropped such that the TCP session is not generated. When the TCP session is generated, transmission of a data packet is possible through the authorized tunnel (1280).

In the process of authenticating the TCP packet, the gateway 203 may compare the header information of the data flow received from the controller 202 with the header information inserted into the payload of the TCP packet received from the terminal 201 to determine whether to perform authentication.

Figure 13:
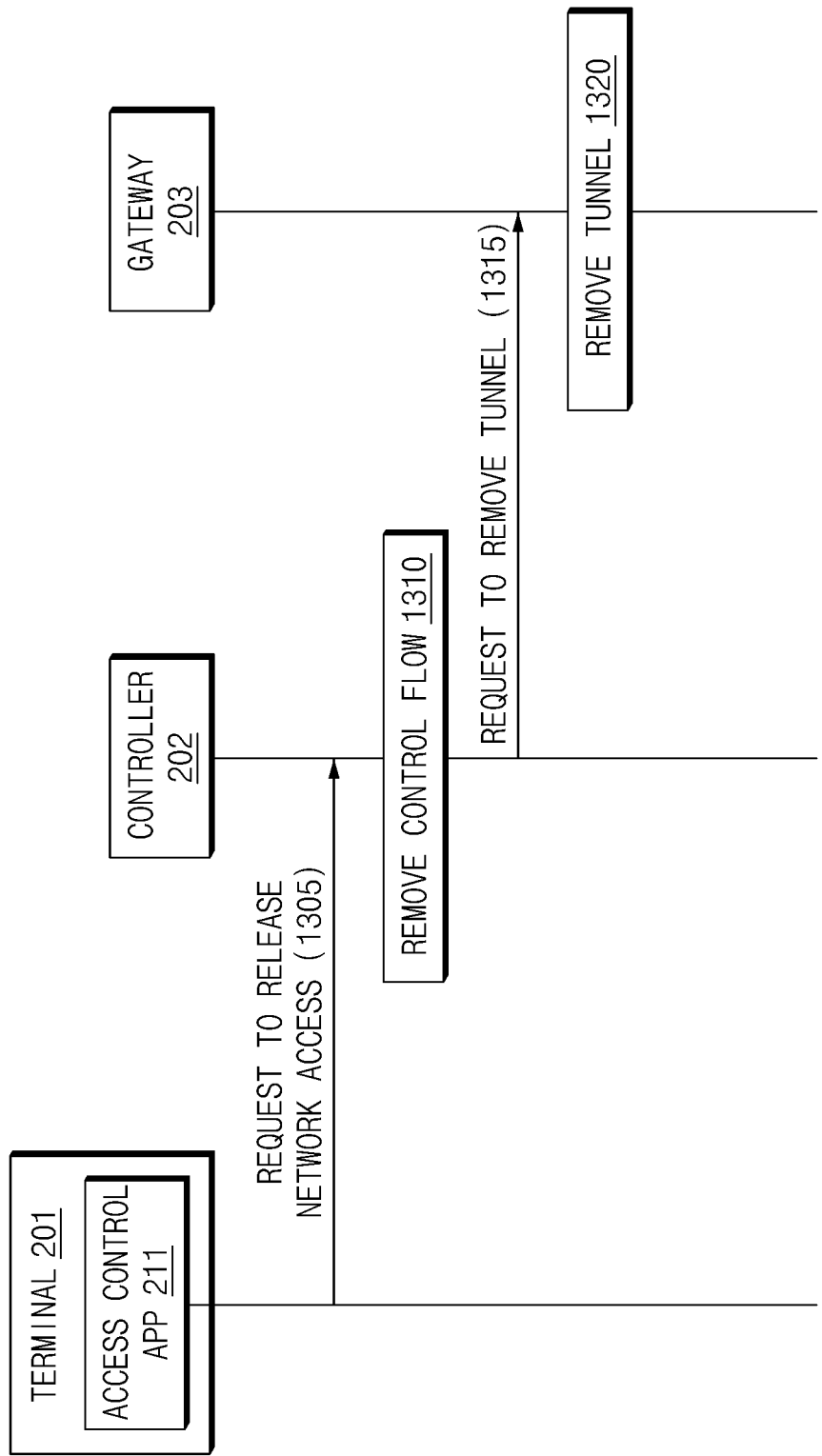
FIG. 13 is a signal sequence diagram illustrating a process of releasing network access of a terminal in a system for controlling network access according to an embodiment of the present disclosure.

FIG. 13 is a signal sequence diagram illustrating a process of releasing network access of a terminal in a system for controlling network access according to an embodiment of the present disclosure.

In operation 1305, a terminal 201 may request a controller 202 to release network access. For example, the terminal 201 may transmit identification information of control flow between the terminal 201 and the controller 202 together with information requesting to release the network access to the controller 202.

Figure 14:
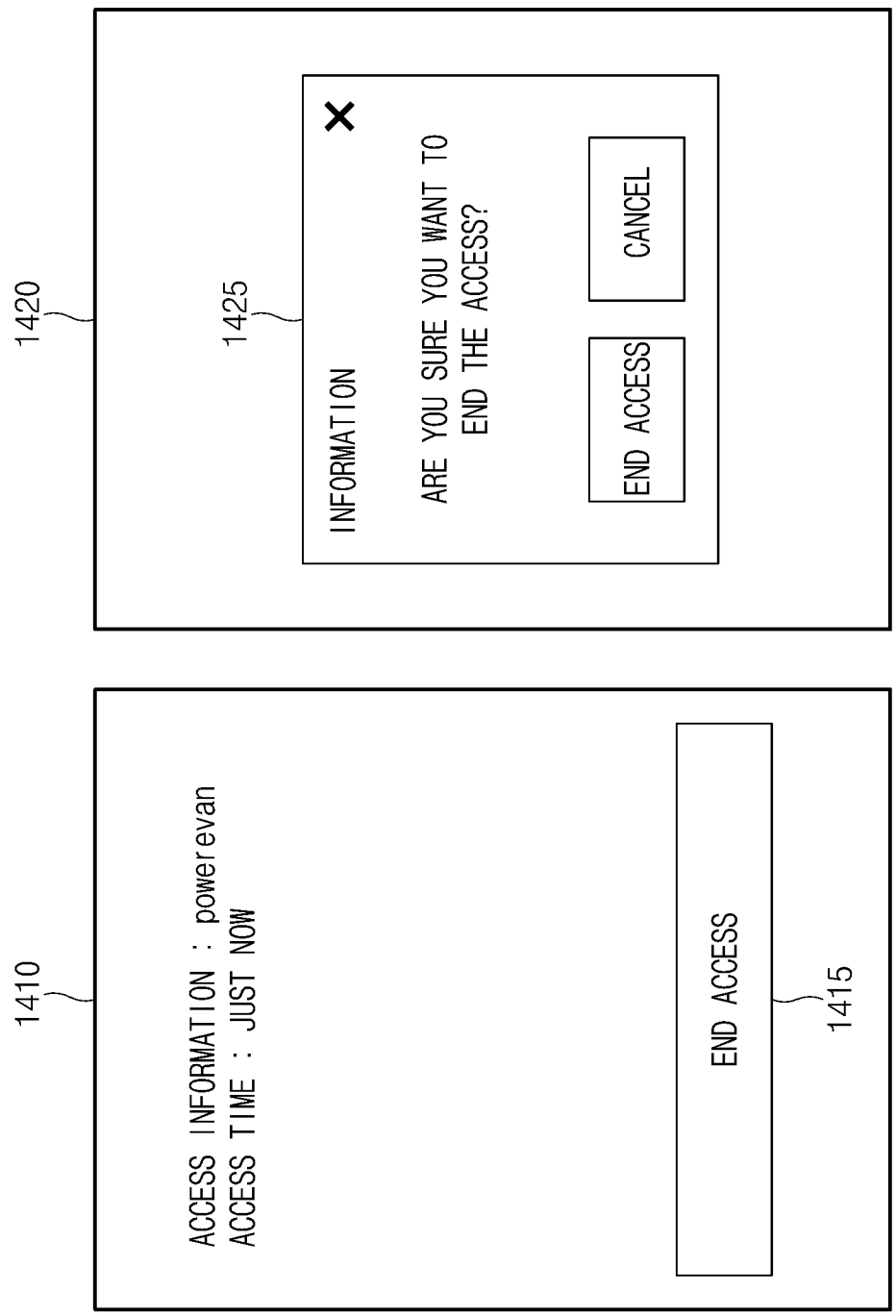
FIG. 14 is a drawing illustrating a user interface screen provided when releasing network access of a terminal in a system for controlling network access according to an embodiment of the present disclosure.

The terminal 201 may attempt to release the network access in response to a network access release event such as a request of a user, restart of the terminal 201, or a request of the access control application 211. For example, referring to FIG. 14, the terminal 201 may receive a user input selecting an access end button 1415 on a user interface screen 1410 output on its display. The terminal 201 may output a user interface screen 1420 including a pop-up window 1425 to identify access end again from the user. For another example, the terminal 201 may immediately perform operation 1305 without outputting the user interface screen 1520.

In operation 1310, the controller 202 may remove (or release) control flow corresponding to the received identification information in response to the request of the terminal 201.

In operation 1315, the controller 202 may request the gateway 203 to remove a tunnel dependent on the removed control flow. The tunnel dependent on the removed control flow may be plural in number. In this case, the controller 202 may request to remove all tunnels dependent on the removed control flow.

In operation 1320, the gateway 203 may remove a tunnel in response to the request of the controller 202. When the tunnel is removed, a data packet transmitted to a destination network corresponding to the controlled tunnel may be blocked by an access control application 211 or the gateway 203. Through the above-mentioned operation, a system for controlling network access may release the authorized tunnel to provide perfect blocking and separation of the terminal 201 from the network.

In operation 1320, the gateway 203 may first remove a TCP session before removing the tunnel in response to the request of the controller 202. Hereinafter, the process of releasing the TCP session will be described with reference to FIG. 15.

Figure 15:
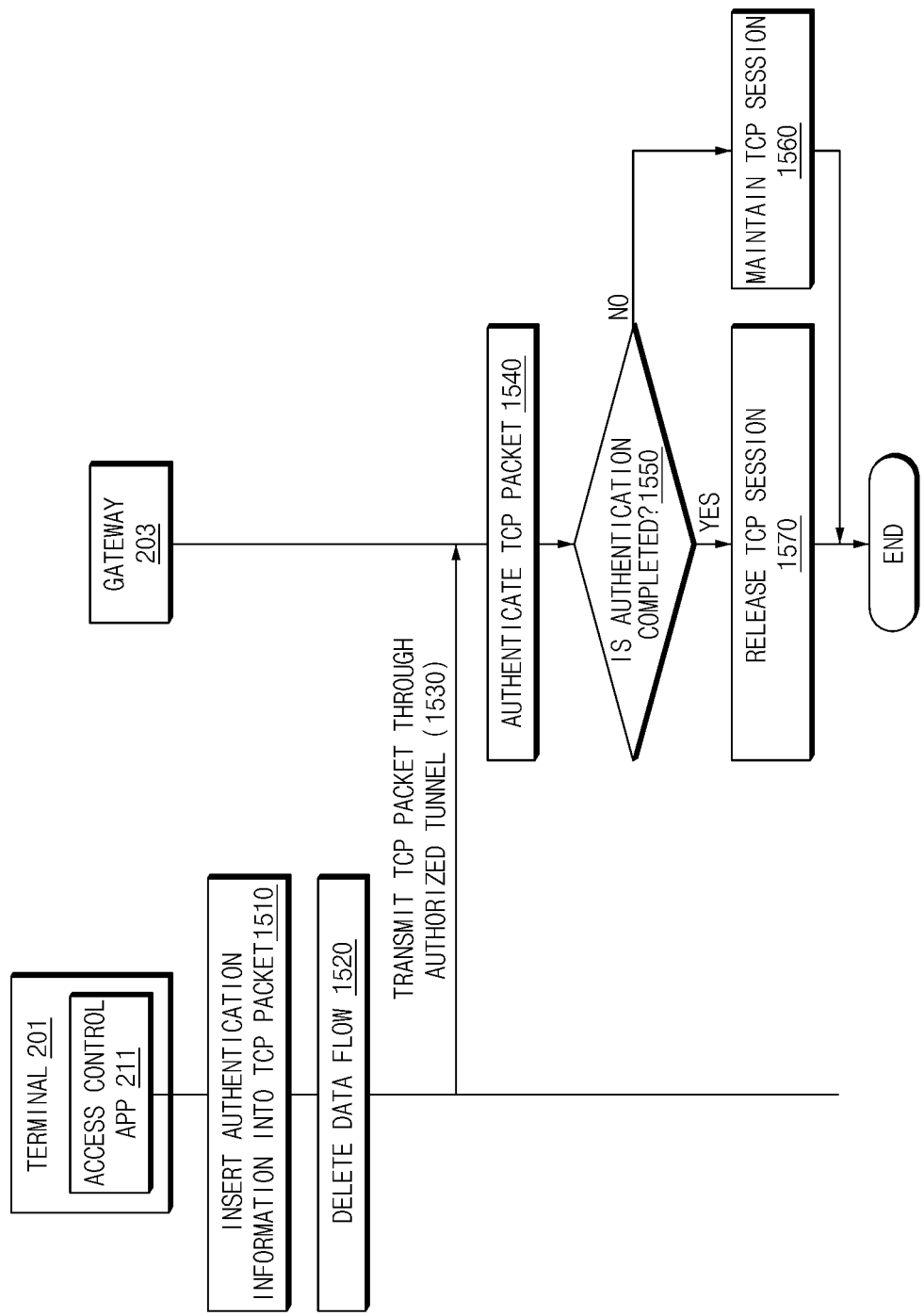
FIG. 15 is a signal sequence diagram illustrating a process of releasing a TCP session in a system for controlling network access according to an embodiment of the present disclosure.

FIG. 15 is a signal sequence diagram illustrating a process of releasing a TCP session in a system for controlling network access according to an embodiment of the present disclosure.

An access control application 211 may insert authentication information into a payload of a TCP packet (e.g., a FIN packet) (1510) and may delete data flow transmitted from a controller 202 (1520). This is to prevent (maintain security) previous authentication information from continuing being used by allowing the access control application 211 to be assigned new data flow from the controller 202 when generating a TCP session with a destination node later.

The access control application 211 may transmit the TCP packet to a gateway 203 through an authorized tunnel 210 (1530).

The gateway 203 may authenticate the TCP packet received from the access control application 211 (1540). When the authenticated result fails (1550), the gateway 203 may drop the TCP packet to maintain the current TCP session (1560). When the authenticated result succeeds (1550), the gateway 203 may transmit the TCP packet to the destination node such that the current TCP session is released (1570). At this time, the gateway 203 may delete the corresponding data flow (data flow corresponding to the TCP session) transmitted from the controller 202.

The invention claimed is:

1. A system for controlling network access, the system including a terminal, the terminal comprising:
   a communication circuitry;
   a processor operatively connected with the communication circuitry; and
   a memory operatively connected with the processor and storing a target application and an access control application, wherein the memory stores instructions that when executed by the processor, cause the terminal to:

request network access of the target application to a server and receive tunnel information and authentication information, by means of the access control application;

insert the authentication information into a transmission control protocol (TCP) packet and transmit the TCP packet to a gateway through a tunnel generated by the tunnel information, by means of the access control application;

transmit a data packet, when a TCP session is established; and the tunnel is generated between the terminal and the gateway based on the tunnel information.

2. the system of claim 1, wherein the instructions cause the terminal to:

insert the authentication information into the TCP packet and transmit the TCP packet to the gateway, when requesting to release the TCP session; and delete the authentication information.

3. The system of claim 2, wherein the authentication information is header information of data flow.

4. The system of claim 3, wherein the instructions cause the terminal to:

insert the header information into a payload of the TCP packet.

5. The system of claim 3, wherein the instructions cause the terminal to:

insert the header information into an IP header of the TCP packet.

6. A system for controlling network access, the system include a gateway, the gateway comprising:

a communication circuitry;

a processor configured to control the communication circuitry to receive tunnel information and authentication information from a server and receive a TCP packet from a terminal through a tunnel corresponding to the tunnel information, authenticate the TCP packet based on the authentication information, and determine whether to generate a TCP session based on the authenticated result; and the tunnel is generated between the terminal and the gateway based on the tunnel information.

7. The system of claim 6, wherein the processor drops the TCP packet, when the authenticated result fails, and transmits the TCP packet to a destination node, when the authenticated result succeeds.

8. The system of claim 6, wherein the processor deletes authentication information received from the server, when the authenticated result succeeds.

9. The system of claim 6, wherein the processor compares the authentication information received from the server with authentication information inserted into the TCP packet received from the terminal to determine whether to perform authentication.

10. The system of claim 6, wherein the authentication information is header information of data flow.

11. A method for controlling network access, the method comprising:

requesting, by a target application of a terminal, network access from a server;

receiving, by the terminal, tunnel information and authentication information from the server by means of an access control application;

inserting, by the terminal, the authentication information into a transmission control protocol (TCP) packet and transmitting, by the terminal, the TCP packet to a gateway through the tunnel generated by the tunnel information, by means of the access control application;

transmitting, by the target application of the terminal, a data packet, when a TCP session is established; and the tunnel is generated between the terminal and the gateway based on the tunnel information.

12. The method of claim 11, further comprising:

inserting, by the terminal, the authentication information into the TCP packet and transmitting, by the terminal, the TCP packet to the gateway through the tunnel, by means of the access control application, when requesting to release the TCP session of the target application; and deleting, by the terminal, the authentication information.

13. The method of claim 12, wherein the authentication information is header information of data flow.

14. The method of claim 13, wherein the inserting of the authentication information is to insert the header information into a payload of the TCP packet.

15. The method of claim 13, wherein the inserting of the authentication information is to insert the header information into an IP header of the TCP packet.

16. A method for controlling network access, the method comprising:

receiving, by a gateway, tunnel information and authentication information from a server;

receiving, by the gateway, a TCP packet from a terminal through a tunnel corresponding to the tunnel information;

authenticating, by the gateway, the TCP packet based on the authentication information;

determining, by the gateway, whether to generate a TCP session based on the authenticated result; and the tunnel is generated between the terminal and the gateway based on the tunnel information.

17. The method of claim 16, wherein the determining of whether to generate the TCP session includes:

dropping the TCP packet, when the authenticated result fails; and transmitting the TCP packet to a destination node, when the authenticated result succeeds.

18. The method of claim 16, further comprising:

deleting the authentication information received from the server, when the authenticated result succeeds.

19. The method of claim 16, wherein the authenticating of the TCP packet includes:

comparing the authentication information received from the server with authentication information inserted into the TCP packet received from the terminal;

determining that authentication succeeds, when identical to each other; and determining that authentication fails, when not identical to each other.

20. The method of claim 16, wherein the authentication information is header information of data flow.

* * * * *